(12) United States Patent
Okada et al.

(10) Patent No.: US 9,862,252 B2
(45) Date of Patent: Jan. 9, 2018

(54) ENGINE DRIVEN HEAT PUMP

(71) Applicant: YANMAR CO., LTD., Osaka-shi (JP)

(72) Inventors: Hideshi Okada, Osaka (JP); Kyoko Hashimoto, Osaka (JP)

(73) Assignee: YANMAR CO., LTD., Osaka-Shi (JP)

(*) Notice: Subject to any disclaimer, the term of this patent is extended or adjusted under 35 U.S.C. 154(b) by 354 days.

(21) Appl. No.: 14/561,859

(22) Filed: Dec. 5, 2014

(65) Prior Publication Data

US 2015/0183297 A1 Jul. 2, 2015

(30) Foreign Application Priority Data

Dec. 27, 2013 (JP) ................................ 2013-272909

(51) Int. Cl.
*B60H 1/32* (2006.01)

(52) U.S. Cl.
CPC .... *B60H 1/3211* (2013.01); *B60H 2001/3266* (2013.01); *B60H 2001/3272* (2013.01)

(58) Field of Classification Search
CPC .......... B60H 2001/3272; B60H 1/3213; B60H 1/322; B60H 2001/3238; F25B 2327/00
USPC ....................................................... 62/323.4
See application file for complete search history.

(56) References Cited

U.S. PATENT DOCUMENTS

| | | | | |
|---|---|---|---|---|
| 3,559,724 A | * | 2/1971 | Wilkinson ................ | F24F 5/00 165/210 |
| 2006/0242985 A1 | * | 11/2006 | Leck .................... | B60H 1/3223 62/323.1 |
| 2007/0101735 A1 | * | 5/2007 | Matsui ...................... | F25B 9/06 62/160 |
| 2011/0154841 A1 | * | 6/2011 | Hsiao ...................... | F25B 27/00 62/238.7 |
| 2011/0214627 A1 | * | 9/2011 | Nishikawa ................ | F01P 7/04 123/41.02 |

(Continued)

FOREIGN PATENT DOCUMENTS

| | | |
|---|---|---|
| JP | 52-073042 A | 4/1987 |
| JP | 2003-314323 A | 11/2003 |
| JP | 2004-271033 A | 9/2004 |

(Continued)

OTHER PUBLICATIONS

Office Action dated Dec. 20, 2016, issued for the Japanese application No. 2013-272909.

*Primary Examiner* — Paul Schwarzenberg

(74) *Attorney, Agent, or Firm* — Locke Lord LLP; Howard M. Gitten

(57) ABSTRACT

An engine driven heat pump includes a compressor clutch to switch between an ON state where drive from an engine is transmitted to a compressor and an OFF state where transmission of the drive from the engine to the compressor is cut off, an engine actuation battery to actuate the engine, a battery charging circuit configured to charge the engine actuation battery, and an inverter configured to convert output power from a generator into a predetermined voltage and a predetermined frequency, and when the compressor clutch is placed into the ON state from the OFF state or placed into the OFF state from the ON state during a self-sustaining operation, engine revolutions, which are revolutions of the engine, are set to reference revolutions required for the generator to supply predetermined power.

1 Claim, 15 Drawing Sheets

(56) References Cited

U.S. PATENT DOCUMENTS

2015/0075198 A1 3/2015 Amakawa et al.

FOREIGN PATENT DOCUMENTS

| JP | 2005-009726 A | | 1/2005 |
|---|---|---|---|
| JP | 2005-140373 A | | 6/2005 |
| JP | 2005140373 A | * | 6/2005 |
| JP | 2006-275405 A | | 10/2006 |
| JP | 4682558 B2 | | 5/2011 |
| JP | 2012-229899 A | | 11/2012 |
| JP | 2012229899 A | * | 11/2012 |
| JP | 2014-167365 A | | 9/2014 |
| JP | 2015-059688 A | | 3/2015 |

* cited by examiner

FIG. 4

| | During Supply of System Power | During Power Failure | During Self-sustaining Operation |
|---|---|---|---|
| Self-Sustaining Switch 102 | OFF | | ON |
| Supply of Alternating Current Power | System Power | Power Failure | Output Power from Inverter |
| Supply of Direct Current Power (For CONTROL) | Power Supply Circuit | — | Engine Actuation Battery | Power Supply Circuit |
| Engine 110 | Stop | Operate | Stop | Actuate | Operate |
| System Cutoff Relay 13 | Excitation (A:Closed, B:Open) | Non-excitation (A:Open, B:Closed) | Excitation (A:Closed, B:Open) |
| Independent Power Supply Relay 14 | Non-excitation (A:Open) | Excitation (A:Closed) |
| Battery Relay 22 | Non-excitation (A:Open) | Non-excitation (A:Open, B:Closed) |
| Starter Relay 164 | Non-excitation (A:Open, B:Closed) | Excitation (A:Closed) | Non-excitation (A:Open) |
| Control Power Supply Relay 15a | Excitation (A:Closed, B:Open) | Non-excitation (A:Open, B:Closed) | Excitation (A:Closed, B:Open) |
| Ignition Power Supply Relay 15b | Excitation (A:Closed, B:Open) | Non-excitation (A:Open, B:Closed) | Excitation (A:Closed, B:Open) |
| Inverter 163 | Non-operation | — | Operation |
| Operational Mode of Control Unit 11 | Ordinary Operational Mode | — | Self-sustaining Mode |

⇧ Power Failure ⇧ Power Restoration

Start Time of Self-sustaining Operation (FIRST EMBODIMENT: OPERATION ONLY BASED ON POWER GENERATION)

TO FIG. 8

(FIRST EMBODIMENT: OPERATION BY COMPRESSOR DURING POWER GENERATION)

(SECOND EMBODIMENT: OPERATION BY SECOND COMPRESSOR DURING POWER GENERATION)

ENGINE DRIVEN HEAT PUMP

CROSS REFERENCE TO RELATED APPLICATIONS

This application is related to co-pending applications: "ENGINE DRIVEN HEAT PUMP" filed even date herewith in the names of Hideshi Okada and Kyoko Hashimoto, which claims priority to Japanese Application No. 2013-272908 filed Dec. 27, 2013 and "ENGINE DRIVEN HEAT PUMP" filed even date herewith in the names of Kyoko Hashimoto, Shohei Amakawa and Masaya Horibe, which claims priority to Japanese Application No. 2013-272910 filed Dec. 27, 2013 each of the above-identified applications is assigned to the assignee of the present application and is incorporated by reference herein.

INCORPORATION BY REFERENCE REGARDING APPLICATION AND PRIORITY

This nonprovisional application claims priority under U.S.C. 119(a) on Patent Application No. 2013-272909 filed in Japan on Dec. 27, 2013, the entire contents of which are hereby incorporated by reference.

BACKGROUND OF THE INVENTION

Field of the Invention

The present invention relates to an engine driven heat pump in which heat exchange is performed by use of a refrigerant, which is sucked and discharged by a compressor driven by an engine, thereby flowing through a refrigerant circuit.

Description of the Related Art

Conventionally, it has been known that a generator is mounted in the engine driven heat pump in which heat exchange is performed by use of a refrigerant, which is sucked and discharged by a compressor driven by the engine, thereby flowing through a refrigerant circuit (see, for example, Japanese Patent No. 4682558).

Japanese Patent No. 4682558 discloses that the engine driven heat pump, in which the generator is mounted, is used as a power supply device at the time of power failure.

However, Japanese Patent No. 4682558 discloses that the engine driven heat pump, in which the generator is mounted, is used as the power supply device during power failure, Japanese Patent No. 4682558 fails to disclose the control of engine revolutions regarding drive, stoppage, increase and decrease in drive capacity of a compressor during a self-sustaining operation.

SUMMARY OF THE INVENTION

The present invention provides an engine driven heat pump, in which a generator is mounted, the engine driven heat pump configured to be used as a power supply device during power failure and configured to provide control constitution of engine revolutions regarding drive, stoppage, increase and decrease in drive capacity of a compressor during a self-sustaining operation.

According to one aspect of the present invention, an engine driven heat pump includes an engine, a compressor configured to be driven by the engine, a refrigerant circuit configured to flow a refrigerant sucked and discharged by the compressor, a generator configured to be driven by the engine, a compressor clutch configured to switch between an ON state where drive from the engine is transmitted to the compressor and an OFF state where transmission of the drive from the engine to the compressor is cut off, an engine actuation battery configured to actuate the engine, a battery charging circuit configured to charge the engine actuation battery, and an inverter configured to convert output power from the generator into a predetermined voltage and a predetermined frequency, wherein when the compressor clutch is placed into the ON state from the OFF state or placed into the OFF state from the ON state, during a self-sustaining operation, engine revolutions, which are revolutions of the engine, are set to reference revolutions required for the generator to supply predetermined power.

According to another aspect of the present invention, a mode can be exemplified where a plurality of compressors are provided, and the compressor clutch is provided in each of the compressors, and when the number of compressor clutches to be connected is increased or decreased during the self-sustaining operation, the engine revolutions are set to the reference revolutions.

According to another aspect of the present invention, with respect to the engine driven heat pump, which includes a generator and is used as a power supply device during power failure, the engine driven heat pump can provide control constitution of engine revolutions regarding drive, stoppage, increase and decrease in drive capacity of a compressor during a self-sustaining operation.

BRIEF DESCRIPTION OF THE DRAWINGS

FIG. 4 is a timing chart illustrating the specific circuit operation of the engine driven heat pump according to the present embodiment.

DESCRIPTION OF THE PREFERRED EMBODIMENT

Hereinafter, the embodiment of the present invention will be described referring to drawings.

Figure 1:
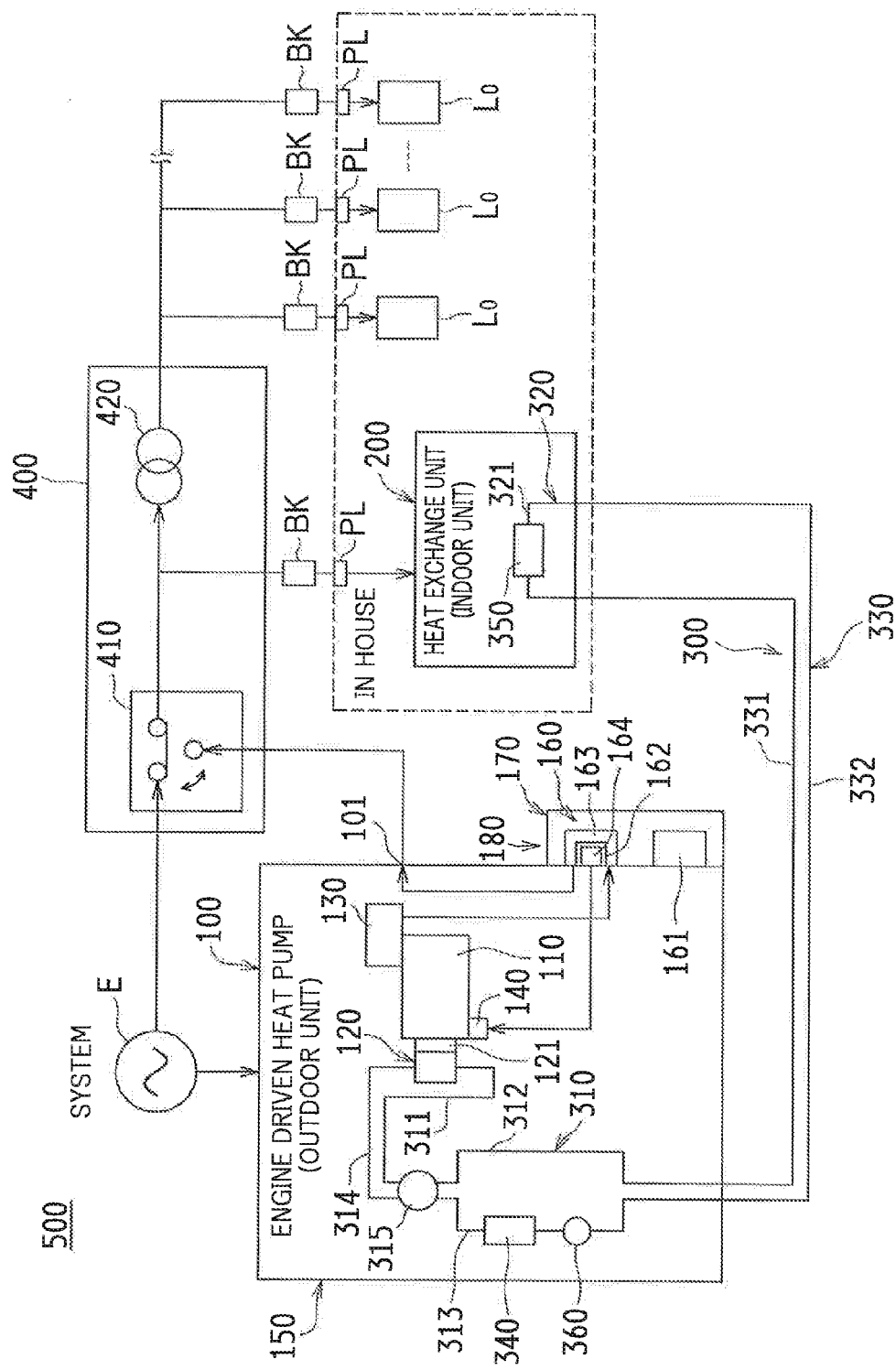
FIG. 1 is a schematic block diagram illustrating one example of a heat exchange system including an engine driven heat pump according to the embodiment of the present invention.

FIG. 1 is a schematic block diagram illustrating one example of a heat exchange system 500 including an engine driven heat pump 100 according to the embodiment of the present invention.

The heat exchange system 500 illustrated in FIG. 1 is provided in such a manner that a refrigerant is circulated through a refrigerant circulation path 300 while a state where the refrigerant is decompressed and brought down to a low temperature and a state where the refrigerant is pressurized and brought up to a high temperature are alternated by means of the engine driven heat pump 100.

The refrigerant circulation path 300 includes a first refrigerant circuit 310 (one example of a refrigerant circuit) provided in the engine driven heat pump 100 (an outdoor unit constituting an air conditioner in the example), a second refrigerant circuit 320 provided in a heat exchange unit 200 (an indoor unit constituting the air conditioner in the example), a third refrigerant circuit 330 with which the first refrigerant circuit 310 and the second refrigerant circuit 320 are communicated, a first heat exchanger 340 provided in the engine driven heat pump 100 and interposed in the first refrigerant circuit 310, a second heat exchanger 350 provided in the heat exchange unit 200 and interposed in the second refrigerant circuit 320, and an expansion valve 360 interposed in the refrigerant circuit (the first refrigerant circuit 310 in the example) provided between the first heat exchanger 340 and the second heat exchanger 350.

The first refrigerant circuit 310 of the engine driven heat pump 100 includes a discharge-side first refrigerant pipe 311 that is connected to a discharge side of a compressor 120 that is driven by an engine 110, thereby sucking and discharging the refrigerant, a one-side first refrigerant pipe 312 that is connected to one side of a third refrigerant pipe 331 on the one side of the third refrigerant circuit 330, an other-side first refrigerant pipe 313 that is connected to a third refrigerant pipe 332 on the other side of the third refrigerant circuit 330, an suction-side first refrigerant pipe 314 that is connected to the suction side of the compressor 120, and a four-way valve 315. The four-way valve 315 is connected to the discharge-side first refrigerant pipe 311, the one-side first refrigerant pipe 312, the other-side first refrigerant pipe 313, and the suction-side first refrigerant pipe 314, and the four-way valve 315 is switchable in such a manner that the refrigerant from the discharge-side first refrigerant pipe 311 is guided to the one-side first refrigerant pipe 312, and the refrigerant from the other-side first refrigerant pipe 313 is guided to the suction-side first refrigerant pipe 314, or in such a manner that the refrigerant from the discharge-side first refrigerant pipe 311 is guided to the other-side first refrigerant pipe 313, and the refrigerant from the one-side first refrigerant pipe 312 is guided to the suction-side first refrigerant pipe 314. The first heat exchanger 340 is provided in the other-side first refrigerant pipe 313, and the expansion valve 360 is provided between the first heat exchanger 340 and the third refrigerant pipe 332 on the other side of the third refrigerant circuit 330 with respect to the other-side first refrigerant pipe 313. The second refrigerant circuit 320 of the heat exchange unit 200 includes a second refrigerant pipe 321 connected to the third refrigerant pipe 331 on the one side of the third refrigerant circuit 330 and the third refrigerant pipe 332 on the other side of the third refrigerant circuit 330. The second heat exchanger 350 is provided in the second refrigerant pipe 321.

With the above-mentioned constitution, when the heat exchange system 500 is utilized for heating or hot-water supply (heating in the example), the four-way valve 315 is switched in such a manner that the refrigerant from the discharge-side first refrigerant pipe 311 is guided to the one-side first refrigerant pipe 312, and the refrigerant from the other-side first refrigerant pipe 313 is guided to the suction-side first refrigerant pipe 314, and the low-temperature refrigerant is brought into indirect contact with the open air or water via the first heat exchanger 340 so as to absorb heat, and further the refrigerant is compressed by the compressor 120 and brought up to a high temperature, and air in a room or water for hot-water supply (air in a room in the example) is heated via the second heat exchanger 350. In contrast, when the heat exchange system 500 is utilized for air conditioning or cold storage (air conditioning in the example), the four-way valve 315 is switched in such a manner that the refrigerant from the discharge-side first refrigerant pipe 311 is guided to the other-side first refrigerant pipe 313, and the refrigerant from the one-side first refrigerant pipe 312 is guided to the suction-side first refrigerant pipe 314, and the high-temperature refrigerant is brought into indirect contact with the open air and the like via the first heat exchanger 340 so as to discharge heat, and further the refrigerant is decompressed through the expansion valve 360 and brought down to a low temperature, and the air in the room or a refrigerator (the room in the example) is cooled via the second heat exchanger 350.

Also, regarding the heat exchange system 500, the engine driven heat pump 100, in which a generator 130 that outputs the output power based on the rotational drive of the engine 110 is mounted, is used as a power supply device at the time of power failure of a system E (specifically, commercial power supply), and the heat exchange system 500 further includes a self-sustaining switching device 400 that switches a system operation and a self-sustaining operation, which is performed at the time of power failure of the system E.

The self-sustaining switching device 400 includes a switching unit 410 that switches operations on whether the system E and wiring attachment connectors PL such as an attachment plug or a wall socket in a house are connected via wiring circuit breakers BK (breaker) or whether an independent output unit 101 of the engine driven heat pump 100 and the wiring attachment connectors PL in the house are connected via the wiring circuit breakers BK.

In the present embodiment, the switching unit 410 automatically switches from/to a system connection state where the system E and the wiring attachment connectors PL are connected when the system power is supplied from the system E to/from a power-failure connection state where the independent output unit 101 of the engine driven heat pump 100 and the wiring attachment connectors PL are connected when the power supply is cut off. It is noted that the switching unit 410 may switch the system connection state and the power-failure connection state in a manual manner.

Also, the self-sustaining switching device 400 further includes a transformer 420. The transformer 420 transforms 200V system voltage to 100V system voltage. The transformer 420 is provided on a connecting line between the wiring circuit breaker BK corresponding to the wiring attachment connector PL for the 200V system (connector connected to the heat exchange unit 200 in the example) and the wiring circuit breaker BK corresponding to the wiring attachment connector PL for the 100V system (in the example, a connector connected to a general load Lo such as an illuminator or a television set that is usually used).

In the present embodiment, regarding the engine driven heat pump 100, a main body package 150 stores the engine 110 (a gas engine in the example), the compressor 120 driven by the engine 110, the first refrigerant circuit 310 that flows the refrigerant sucked and discharged by the compressor 120, a compressor clutch 121 (specifically, a compressor electromagnetic clutch) that switches an ON state where the rotational drive from the engine 110 is transmitted to the compressor 120 (a drive connection state from the engine 110 to the compressor 120, that is, the drive state of the compressor 120) and an OFF state where the transmission of the rotational drive from the engine 110 to the compressor 120 is cut off (a drive cutoff state from the engine 110 to the compressor 120, that is, the stoppage state of the compressor 120), and the generator 130 driven by the engine 110. More particularly, a driving force from the engine 110 is transmitted to the compressor 120 via the compressor clutch 121. The driving force from the engine 110 is transmitted to the generator 130 directly or indirectly via a driving transmission means not illustrated. It is noted that the engine 110 is provided as a gas engine, but not limited thereto. Engines except for the gas engine may be applied.

The engine driven heat pump 100 includes a self-sustaining power supply device 160 that includes an engine actuation battery 161 that supplies power to an engine starter 140 (specifically, a starter motor) for starting the engine 110 and actuates the engine 110, a battery charging circuit 162 (specifically, a battery charger) that charges the engine actuation battery 161, and an inverter 163 (specifically, a self-sustaining inverter) that converts the output power from the generator 130 into a predetermined voltage and a predetermined frequency. In the present embodiment, the self-sustaining power supply device 160 further includes a starter relay 164. The starter relay 164 is connected between the engine starter 140 and the engine actuation battery 161 and configured to supply battery power from the engine actuation battery 161 to the engine starter 140.

It is noted that the inverter 163 can switch two frequencies that are different from each other (specifically, 50 Hz or 60 Hz). Regarding the engine driven heat pump 100, the self-sustaining power supply device 160 is stored in a separate body package 170 that is separate from the main body package 150. A battery unit 180 is constituted by the self-sustaining power supply device 160 and the separate body package 170.

<Electric Circuit in Engine Driven Heat Pump>

Next, the electric circuit of the engine driven heat pump 100 according to the present embodiment will be described.

Figure 2:
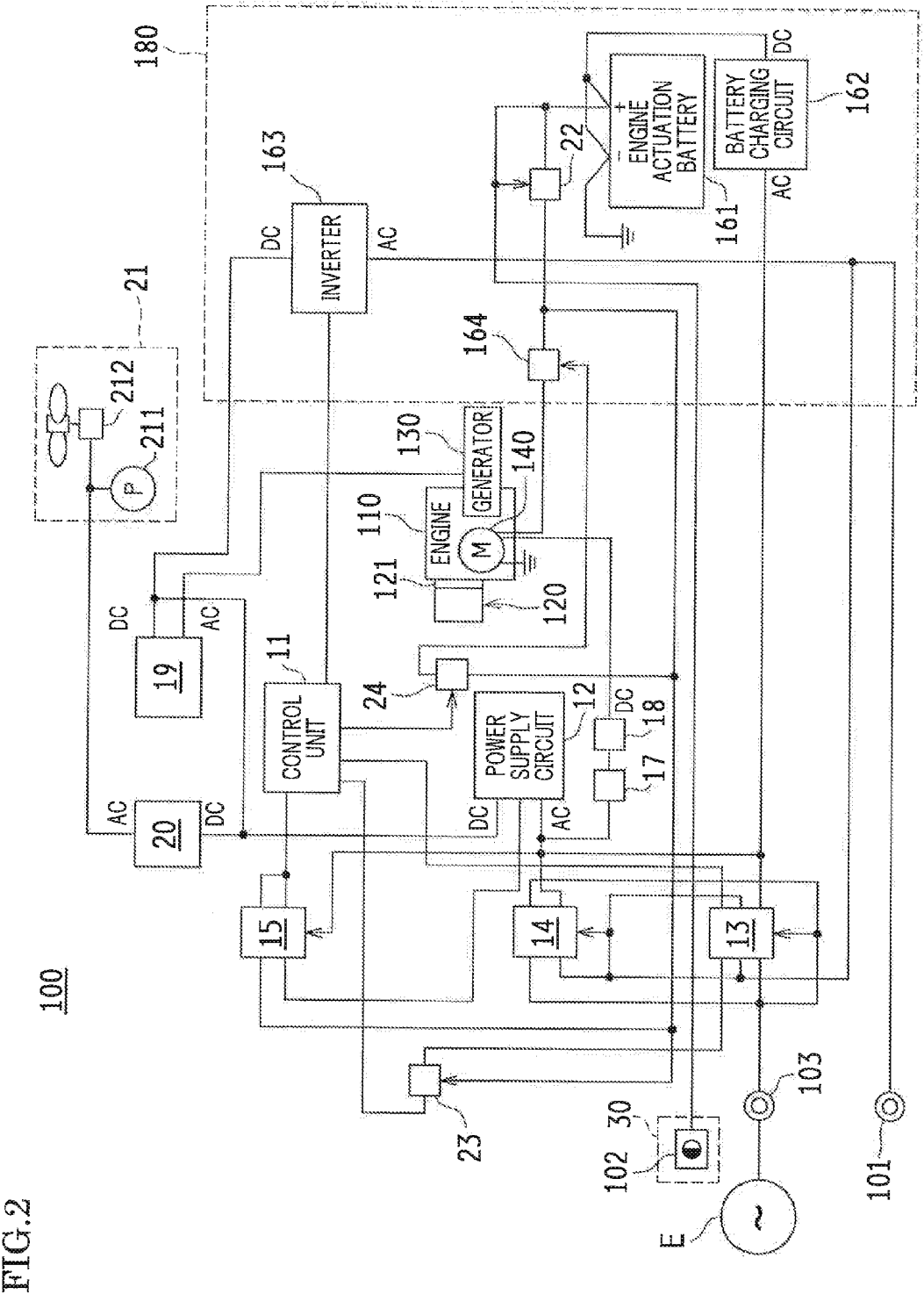
FIG. 2 is a block diagram illustrating the schematic constitution of the electric circuit of the engine driven heat pump according to the present embodiment.

FIG. 2 is a block diagram illustrating the schematic constitution of the electric circuit of the engine driven heat pump 100 according to the present embodiment.

As illustrated in FIG. 2, the engine driven heat pump 100 includes a control unit 11, a power supply circuit 12, a system cutoff relay 13, an independent power supply relay 14, and a self-sustaining switch 102, in addition to the engine 110, the compressor 120, the generator 130, the engine actuation battery 161, the battery charging circuit 162, the inverter 163, the starter relay 164, the engine starter 140, and the independent output unit 101, each of which is described above.

The control unit 11 gains the whole control of the engine driven heat pump 100 and constitutes a control board. The control unit 11 includes a processing unit (not illustrated) such as a Central Processing Unit (CPU) and a storage unit (not illustrated) that includes a nonvolatile memory such as Read Only Memory (ROM), a rewritable nonvolatile memory such as a flash memory, and a volatile memory such as Random Access Memory (RAM). In the engine driven heat pump 100, the processing unit of the control unit 11 loads a control program stored in advance in the ROM of the storage unit on the RAM of the storage unit and executes the control program, thereby controlling various constitutional elements. Also, various system information such as the operational parameters and setting data of the engine driven heat pump 100 is stored in the nonvolatile memory of the storage unit.

Then, the control unit 11 is configured to switch between an ordinary operational mode for driving the engine 110 in a case where a user's request (a user's instruction) for a heat pump operation (air conditioning in the example) is provided and a self-sustaining mode for driving the engine 110 irrespective of the request for the heat pump operation (air conditioning in the example).

The power supply circuit 12 supplies power to electric instruments (in the example, the control unit 11 and an ignition plug, not illustrated, of the engine 110) in the engine driven heat pump 100 and constitutes a power supply board. The power supply circuit 12 converts the input power of an alternating current into the output power of a direct current and serves as a power supply for the control unit 11 or as a power supply for the ignition plug of the engine 110 in the example.

The system cutoff relay 13 is configured to self-hold a closed state based on the power of the system E, connect to the system E, the power supply circuit 12, and the battery charging circuit 162, and supply the system power from the system E to the power supply circuit 12 and the battery charging circuit 162, whereas the system cutoff relay 13 is configured to fall into an open state at the time of power failure and cut off the connection between the system E, and the power supply circuit 12 and the battery charging circuit 162.

When the independent power supply relay 14 is connected in parallel with the system cutoff relay 13 with respect to the power supply circuit 12 and the battery charging circuit 162, and when the power from the system E is supplied, the independent power supply relay 14 is configured to fall into an open state and cut off the connection between the system cutoff relay 13, and the power supply circuit 12 and the battery charging circuit 162, whereas the independent power supply relay 14 is configured to self-hold a closed state based on the output power from the inverter 163 at the time of power failure, connect the inverter 163 with the power supply circuit 12 and the battery charging circuit 162, and supply the output power from the inverter 163 to the power supply circuit 12 and the battery charging circuit 162.

The self-sustaining switch 102 is configured to maintain an ON state based on a user's ON operation, whereas the self-sustaining switch 102 is configured to be turned off from the ON state based on the user's OFF operation and maintain an OFF state. More particularly, the self-sustaining switch 102 includes functions of manually switching the connection or cutoff between the engine actuation battery 161 and the control unit 11 only during the power failure and manually switching ON/OFF (presence and absence) of a self-sustaining signal that instructs the control unit 11 to perform a self-sustaining operation. It is noted that the self-sustaining switch 102 can be operated from a control panel 30 in a house.

In the present embodiment, the engine driven heat pump 100 further includes an input power supply relay 15.

The input power supply relay 15 is configured to supply the output power from the power supply circuit 12 to the control unit 11, whereas when the self-sustaining switch 102 is turned on at the time of power failure, the input power supply relay 15 is configured to supply the battery power from the engine actuation battery 161 to the control unit 11.

It is noted that members that are not described in FIG. 2 will be described in specific circuit constitution below.

<Regarding Specific Circuit Constitution>

Next, the specific circuit constitution of the engine driven heat pump 100 according to the present embodiment will be described referring to FIG. 3.

Figure 3:
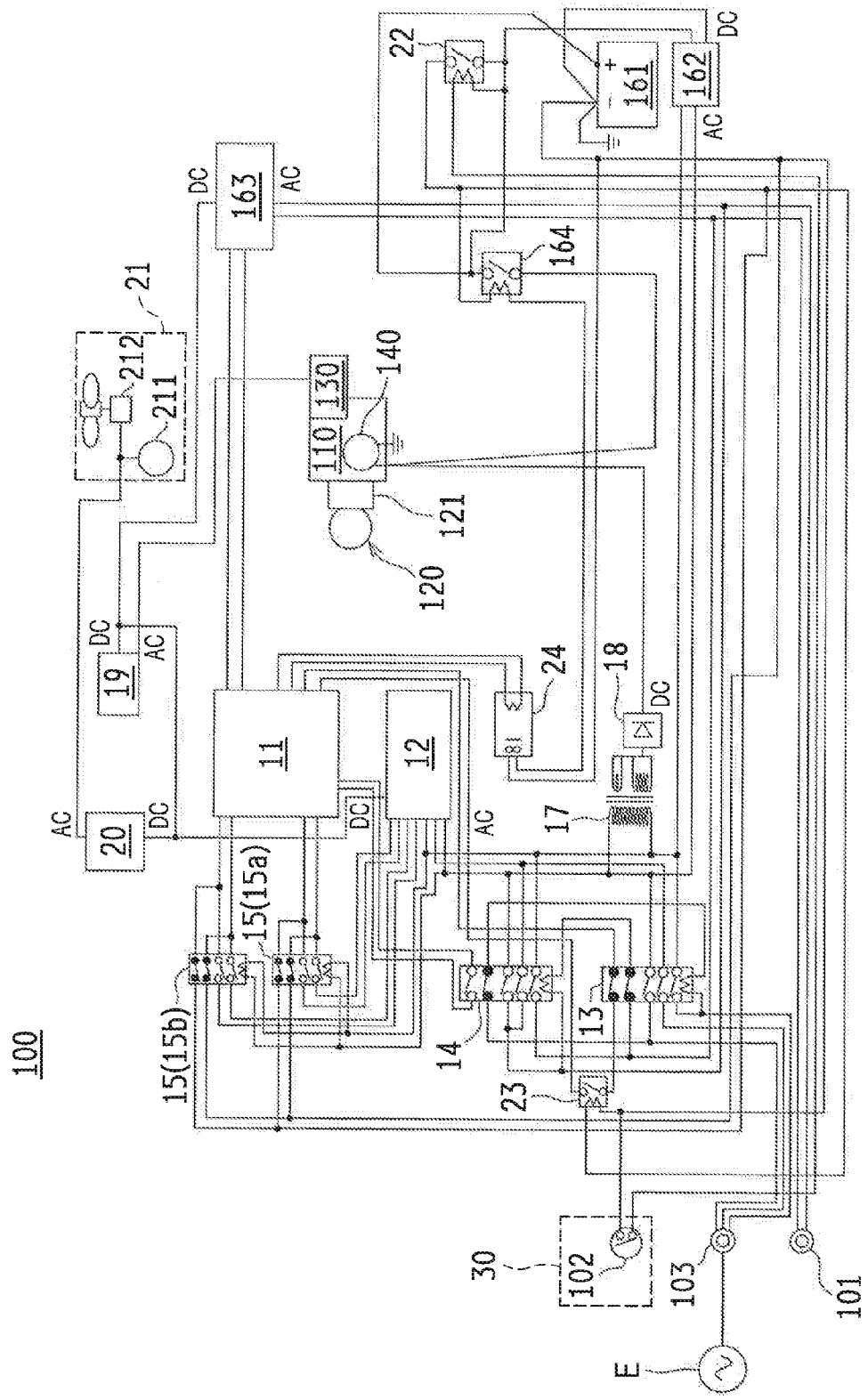
FIG. 3 is a detailed diagram of the electric circuit in the engine driven heat pump according to the present embodiment.

FIG. 3 is a detailed diagram of an electric circuit in the engine driven heat pump 100 according to the present embodiment.

(Circuit Constitution Regarding Circuit Operation when System Power is Supplied)

The system cutoff relay 13 includes an A contact point (○ illustrated in FIG. 3) at which the system cutoff relay 13 is conducted (closed) in an excited state where an exciting coil is excited and non-conducted (opened) in a non-excited state where the exciting coil is not excited and a B contact point (● illustrated in FIG. 3) at which the system cutoff relay 13 is non-conducted (opened) in the excited state and conducted (closed) in the non-excited state. Herein, the meaning of the A contact point or the B contact point is similarly applied to the independent power supply relay 14, the input power supply relay 15 (specifically, a control power supply relay 15a and an ignition power supply relay 15b), a battery relay 22 described later, a self-sustaining input relay 23, a starter relay 164, and a control relay 24.

The system cutoff relay 13 includes three A contact points (○) and two B contact points (●), and the independent power supply relay 14 includes four A contact points (○) and one B contact point (●). The input power supply relay 15 is constituted by the control power supply relay 15a and the ignition power supply relay 15b. The input power supply relay 15 (specifically, the control power supply relay 15a and the ignition power supply relay 15b) includes two A contact points (○) and two B contact points (●).

The engine driven heat pump 100 further includes a system input unit 103 connected to the system E, a starting transformer 17 that steps down the system voltage of the system E, a rectifier circuit 18 (specifically, a rectifier) that converts alternating current power from the starting transformer 17 into direct current power, a generator controller 19 that output-controls the output power (alternating current power) from the generator 130 and gains generation power (direct current power) required for power generation, and an internal instrument 21 (internal electric instrument) that includes an engine cooling water pump 211 and an outdoor fan 212 that are driven based on the generation power from the generator controller 19 via an internal instrument power converter 20. The internal instrument power converter 20 supplies the drive power (alternating current power), which is gained by converting the generation power (direct current power) from the generator controller 19, to the internal instrument 21 that includes the engine cooling water pump 211 and the outdoor fan 212. Herein, the generator controller 19 acts as a direct current stabilized power supply that output-controls the output voltage (alternating current voltage) from the generator 130 in such a manner that the output voltage from the generator 130 is held at a constant generation voltage (direct current voltage). The internal instrument power converter 20 acts as an internal instrument inverter that converts the generation power (direct current power) from the generator controller 19 into the drive power (alternating current power).

The system input unit 103 constitutes an external input terminal and inputs the system power from the system E.

The system input unit 103 is connected to the alternating current side of the power supply circuit 12, the input side of the starting transformer 17, the exciting coil of the input power supply relay 15 (specifically, the control power supply relay 15a and the ignition power supply relay 15b), and the input side of the battery charging circuit 162 via the three A contact points (○) of the system cutoff relay 13. Also, the system input unit 103 is connected to the exciting coil of the system cutoff relay 13 via one B contact point (●) of the independent power supply relay 14.

The output side of the starting transformer 17 is connected to the engine starter 140 via the rectifier circuit 18.

The power supply input port (specifically, a control power supply port and an ignition power supply port) of the control unit 11 is connected to the direct current side of the power supply circuit 12 via the two A contact points (○) of the input power supply relay 15 (specifically, the control power supply relay 15a and the ignition power supply relay 15b).

Also, the direct current side of the power supply circuit 12 and the direct current side of the generator controller 19 are connected to the internal instrument 21 via the internal instrument power converter 20. The alternating current side of the generator controller 19 is connected to the generator 130.

Furthermore, the output side of the battery charging circuit 162 is connected to the engine actuation battery 161.

It is noted that, although not illustrated, an earth leakage breaker (ELB: Earth Leakage circuit Breaker) is connected between the system input unit 103, and the system cutoff relay 13 and the independent power supply relay 14. A starter relay whose operation is controlled by the control unit 11 is connected between the rectifier circuit 18 and the engine starter 140. A power-failure capacitor is connected in the middle of the line between the two A contact points (○) disposed between the control power supply relay 15*a* and the control power supply port of the control unit 11. A generator reactor is connected between the generator 130 and the input side of the generator controller 19.

(Circuit Constitution Regarding Circuit Operation when System Power is Cut Off)

The engine driven heat pump 100 further includes the battery relay 22, the self-sustaining input relay 23, and the control relay 24.

The battery relay 22 is configured to cut off the connection between the engine actuation battery 161 and the exciting coil of the self-sustaining input relay 23, whereas when the self-sustaining switch 102 is turned on by a user, the battery relay 22 is configured to supply the battery power from the engine actuation battery 161 to the exciting coil of the self-sustaining input relay 23.

The self-sustaining input relay 23 is configured to cut off the conduction of the self-sustaining instruction port of the control unit 11, whereas when the battery power from the engine actuation battery 161 is supplied to the exciting coil via the battery relay 22, the self-sustaining input relay 23 is configured to bring the self-sustaining instruction port of the control unit 11 into conduction. Herein, when the self-sustaining instruction port is conducted, and the control unit 11 receives a self-sustaining signal, the control unit 11 can recognize that the self-sustaining switch 102 is turned on by the user, and that the self-sustaining operation is instructed, whereby the control unit 11 can switch operational modes to a self-sustaining mode.

The control relay 24 is configured to cut off the connection between the engine actuation battery 161 and the exciting coil of the starter relay 164, whereas when engine starting power from the control unit 11 is supplied to the exciting coil, the control relay 24 is configured to supply the battery power from the engine actuation battery 161 to the exciting coil of the starter relay 164.

The starter relay 164 is configured to cut off the connection between the engine actuation battery 161 and the engine starter 140, whereas when the battery power from the engine actuation battery 161 is supplied to the exciting coil via the control relay 24, the starter relay 164 is configured to supply the battery power from the engine actuation battery 161 to the engine starter 140.

Specifically, any of the battery relay 22, the self-sustaining input relay 23, the control relay 24, and the starter relay 164 includes one A contact point (○).

The exciting coil of the battery relay 22 is connected to the engine actuation battery 161 via the self-sustaining switch 102.

The exciting coil of the self-sustaining input relay 23 is connected to the engine actuation battery 161 via the A contact point (○) of the battery relay 22. The self-sustaining instruction port of the control unit 11 is connected via the A contact point (○) of the self-sustaining input relay 23 and one B contact point (●) of the system cutoff relay 13 and constitutes a closed circuit of the self-sustaining signal.

The exciting coil of the control relay 24 is connected to the engine starting output port of the control unit 11.

The exciting coil of the starter relay 164 is connected to the engine actuation battery 161 via the A contact point (○) of the control relay 24 and the A contact point (○) of the battery relay 22. The engine starter 140 is connected to the engine actuation battery 161 via the A contact point (○) of the starter relay 164.

The power supply input port (specifically, the control power supply port and the ignition power supply port) of the control unit 11 is connected to the engine actuation battery 161 via the two B contact points (●) of the input power supply relay 15 (specifically, the control power supply relay 15*a* and the ignition power supply relay 15*b*) and the A contact point (○) of the battery relay 22.

The signal input side of the inverter 163 is connected to the inverter output confirmation port of the control unit 11.

Furthermore, the direct current side of the generator controller 19 is connected to the input side (direct current side) of the inverter 163.

Herein, although not illustrated, a fuse is connected between the A contact point (○) of the starter relay 164 and the exciting coil of the battery relay 22, and between the B contact point (●) of the input power supply relay 15 (specifically, the control power supply relay 15*a* and the ignition power supply relay 15*b*) and the A contact point (○) of the battery relay 22. The fuse and a battery switch are connected in series between the self-sustaining switch 102 and the exciting coil of the battery relay 22. The fuse and an independent actuation display lamp, which are disposed in parallel to the self-sustaining input relay 23, are connected in series between the terminals of the exciting coil of the self-sustaining input relay 23.

It is noted that other circuit constitution with regard to the circuit constitution regarding circuit operations at the time of power failure has been described. Accordingly, its description is omitted.

(Circuit Constitution Regarding Circuit Operation in Self-Sustaining Operation)

When the output power from the inverter 163 is received after the establishment of the voltage of the generator 130, the engine driven heat pump 100 is configured to supply the output power from the inverter 163 to the power supply circuit 12 and the battery charging circuit 162 by means of the independent power supply relay 14 and supply the output power from the inverter 163 to the outside of the engine driven heat pump 100 via the independent output unit 101.

Also, while the output power from the inverter 163 is being supplied, the engine driven heat pump 100 is configured to maintain the cutoff of the connection between the system E, and the power supply circuit 12 and the battery charging circuit 162 by means of the system cutoff relay 13 and maintain the output power from the inverter 163 until the self-sustaining signal is interrupted.

Also, when the power is restored, and the output power from the inverter 163 is interrupted, the engine driven heat pump 100 is configured to restore the connection between the system E, and the power supply circuit 12 and the battery charging circuit 162 by means of the system cutoff relay 13.

In the present embodiment, when the output power from the inverter 163 is interrupted, the engine driven heat pump 100 is configured to cut off the connection between the inverter 163, and the power supply circuit 12 and the battery charging circuit 162 by means of the independent power supply relay 14.

More particularly, the independent output unit 101 is connected in parallel to the independent power supply relay 14 with respect to the inverter 163 and constitutes external output terminals. The independent output unit 101 is connected to the switching unit 410 illustrated in FIG. 1 and configured to supply the output power from the inverter 163 to the switching unit 410.

When the output power from the inverter 163 is supplied to the exciting coil, the independent power supply relay 14 is configured to supply the output power from the inverter 163 to the power supply circuit 12 and the battery charging circuit 162, and the inverter output confirmation port of the control unit 11 is conducted. Herein, when the inverter output confirmation port is conducted, and the inverter output signal is received, the control unit 11 can recognize that the output power from the inverter 163 is outputted.

Specifically, the output side (alternating current side) of the inverter 163 is connected to the alternating current side of the power supply circuit 12, the input side of the starting transformer 17, the exciting coil of the input power supply relay 15 (specifically, the control power supply relay 15a and the ignition power supply relay 15b), and the input side of the battery charging circuit 162 via three A contact points (○) of the independent power supply relay 14. Also, the output side of the inverter 163 is connected to the independent output unit 101. Furthermore, the output side of the inverter 163 is connected to the exciting coil of the independent power supply relay 14 via one B contact point (●) of the system cutoff relay 13. Herein, as described above, the system input unit 103 is connected to the exciting coil of the system cutoff relay 13 via the B contact point (●) of the independent power supply relay 14, and the output side of the inverter 163 is connected to the exciting coil of the independent power supply relay 14 via the B contact point (●) of the system cutoff relay 13. Accordingly, a circuit constituted between the system cutoff relay 13 and the independent power supply relay 14, which are connected in an above-mentioned manner, constitutes a circuit (so-called an interlock circuit) in which, with respect to the system cutoff relay 13 and the independent power supply relay 14, priority is placed on a one-side relay that operates first (excitation), and the operation (excitation) of the other-side relay is prohibited.

Also, the inverter output confirmation port of the control unit 11 is connected via one A contact point (○) of the independent power supply relay 14, thereby constituting the closed circuit of the inverter output signal.

Herein, although not illustrated, a cross current prevention transformer is connected between the independent power supply relay 14 and a branch portion on the independent power supply relay 14 side of the output side of the inverter 163, and a circuit protector (CP: Circuit Protector) is provided between the independent output unit 101 and a branch portion on the independent output unit 101 side of the output side of the inverter 163.

It is noted that other circuit constitution with regard to the circuit constitution regarding circuit operations at the time of the self-sustaining operation has been described. Accordingly, its description is omitted.

FIG. 4 is a timing chart illustrating the specific circuit operation of the engine driven heat pump 100 according to the present embodiment.

In the engine driven heat pump 100 described above, at the time of the system power supply, the power failure, and the self-sustaining operation, the operational mode is represented as operational states illustrated in FIG. 4, regarding the self-sustaining switch 102, the supply of alternating current power, the supply of direct current power, the engine 110, the system cutoff relay 13, the independent power supply relay 14, the battery relay 22, the starter relay 164, the control power supply relay 15a, the ignition power supply relay 15b, the inverter 163, and the control unit 11.

Herein, the circuit operations of the engine driven heat pump 100 at the time of power failure and the self-sustaining operation will be described below, and the circuit operations of the engine driven heat pump 100 at the time of the system power supply and the like will be omitted. It is noted that the specification regarding Japanese Patent Application No. 2013-193237, which has been filed by the applicant, discloses the circuit operations of the engine driven heat pump 100 at the time of the system power supply.

(Circuit Operations of Engine Driven Heat Pump at Time of Power Failure)

Regarding the engine driven heat pump 100, when the self-sustaining switch 102 is turned on by the user from a state where the power of the system E is cut off, the battery power from the engine actuation battery 161 is supplied to the exciting coil of the battery relay 22, and the A contact point (○) of the battery relay 22 is conducted. Subsequently, regarding the engine driven heat pump 100, the battery power from the engine actuation battery 161 is supplied to the power supply input port (specifically, the control power supply port and the ignition power supply port) of the control unit 11 via the A contact point (○), which is in a conductive state with respect to the battery relay 22, and the B contact point (●), which is in a conductive state with respect to the input power supply relay 15 (specifically, the control power supply relay 15a and the ignition power supply relay 15b), and furthermore supplied to the exciting coil of the self-sustaining input relay 23 via the A contact point (○), which is in a conductive state with respect to the battery relay 22, and the A contact point (○) of the self-sustaining input relay 23 is conducted.

Accordingly, the battery power from the engine actuation battery 161 is supplied to the control unit 11, and the self-sustaining instruction port of the control unit 11 is conducted via the A contact point (○), which is in a conductive state with respect to the self-sustaining input relay 23, so that the control unit 11 can receive the self-sustaining signal. Consequently, the control unit 11 enters the operational state and further can recognize that the self-sustaining switch 102 is turned on by the user and the self-sustaining operation is instructed.

Then, when the control unit 11 recognizes that the self-sustaining operation is instructed by the user, the control unit 11 switches the operational mode to the self-sustaining mode, the engine starting power is supplied from the engine starting output port to the exciting coil of the control relay 24 for a predetermined period of time, irrespective of the user's request for the heat pump operation (air conditioning in the example) (specifically, the transmission for a predetermined period of time (for example, five seconds) is repeated at predetermined times at predetermined intervals (for example, for every three seconds)), and the battery power from the engine actuation battery 161 is supplied to the exciting coil of the starter relay 164 via the A contact point (○) of the control relay 24. Accordingly, the A contact point (○) of the starter relay 164 is conducted for a predetermined period of time, and the battery power from the engine actuation battery 161 is supplied to the engine starter 140 via the A contact point (○) of the starter relay 164, thereby starting the engine 110 and starting the generator 130.

Also, regarding the engine driven heat pump 100, the output power from the generator 130 is supplied to the input side of the inverter 163 via the generator controller 19, and the output power from the generator 130 is supplied to the internal instrument 21 via the generator controller 19 and the internal instrument power converter 20.

(Circuit Operations of Engine Driven Heat Pump at Time of Self-Sustaining Operation)

Regarding the engine driven heat pump 100, in a state of the circuit operation at which the generator 130 is actuated, when the control unit 11 transmits the output instruction signal from the inverter output instruction port to the signal input side of the inverter 163 after the establishment of the voltage of the generator 130 (when the voltage reaches a predetermined voltage or higher, or after a predetermined period of time has passed), and the inverter 163 is actuated, the output power from the inverter 163 is supplied to the exciting coil of the independent power supply relay 14 via the B contact point (●), which is in a conductive state with respect to the system cutoff relay 13, and the A contact point (○) of the independent power supply relay 14 is conducted, while the B contact point (●) of the independent power supply relay 14 is non-conducted. Accordingly, regarding the engine driven heat pump 100, the output power from the inverter 163 is supplied to the alternating current side of the power supply circuit 12, the input side of the starting transformer 17, the exciting coil of the input power supply relay 15 (specifically, the control power supply relay 15*a* and the ignition power supply relay 15*b*), and the input side of the battery charging circuit 162 via the A contact point (○), which is in a conductive state with respect to the independent power supply relay 14, and the A contact point (○) of the input power supply relay 15 (specifically, the control power supply relay 15*a* and the ignition power supply relay 15*b*) is conducted, whereas the B contact point (●) of the input power supply relay 15 is non-conducted.

Accordingly, in place of the battery power from the engine actuation battery 161, the engine driven heat pump 100 can supply the output power from the inverter 163 to the power supply input port of the control unit 11 (specifically, the control power supply port and the ignition power supply port) via the power supply circuit 12 and the A contact points (○), which is in a conductive state with respect to the input power supply relay 15 (specifically, the control power supply relay 15*a* and the ignition power supply relay 15*b*). Also, the engine driven heat pump 100 can supply the output power from the inverter 163 to the rectifier circuit 18 via the starting transformer 17 and supply the output power from the inverter 163 to the engine actuation battery 161 via the battery charging circuit 162. Furthermore, the engine driven heat pump 100 can supply the output power from the inverter 163 to the outside of the engine driven heat pump 100 via the independent output unit 101 (in the example, the switching unit 410 of the self-sustaining switching device 400 (see FIG. 1)).

<Control Constitution of Engine Revolutions Regarding Compressor>

Incidentally, it is necessary to supply a predetermined power or higher set in advance from the generator 130 at all times, irrespective of a request of the heat pump operation (air conditioning in the example) during the self-sustaining operation. That is, the engine revolutions C, which are the revolutions of the engine 110, always need to be equal to or higher than the minimum revolutions Ca which are required for the generator 130 to supply the predetermined power, regardless of presence or absence of the load in the heat pump operation (load of air conditioning in the example) during the self-sustaining operation. For example, in a case where the compressor clutch 121 is switched from the OFF state (the stoppage state of the compressor 120) to the ON state (the drive state of the compressor 120) during the self-sustaining operation, and the drive capacity of the compressor 120 is increased (a case is included where the drive capacity is generated from a state where no drive capacity is provided), and a case where the compressor clutch 121 is switched from the ON state (the drive state of the compressor 120) to the OFF state (the stoppage state of the compressor 120) during the self-sustaining operation, and the drive capacity of the compressor 120 is decreased (a case is included where the drive capacity is eliminated from a state where the drive capacity is provided), when the engine revolutions C are not equal to or higher than the minimum revolutions Ca which are required for the generator 130 to supply the predetermined power, the supply of the power from the generator 130 is destabilized. Herein, the engine revolutions C mean the revolutions (revolution speed) per unit time of the engine 110. Also, the drive capacity of the compressor 120 means the output capacity (discharge capacity) of the refrigerant.

On the other hand, for example, when the engine revolutions C correspond to an upper-limit revolutions Cb set in advance as the upper limit of the engine revolutions C during power generation, or revolutions near to the upper-limit revolutions Cb, and when the compressor clutch 121 is switched from the ON state (the drive state of the compressor 120) to the OFF state (the stoppage state of the compressor 120), the load of the compressor 120 with respect to the engine 110 is eliminated (or when a plurality of compressors 120 or a plurality of compressor clutches 121 are provided, the load of the compressor 120 with respect to the engine 110 is reduced), whereby the engine 110 is excessively rotated, and in any case, the supply of the power from the generator 130 is destabilized.

Accordingly, in the engine driven heat pump 100 according to the present embodiment, the control operation of the engine revolutions C regarding the compressor 120 during the self-sustaining operation is provided as follows.

Figure 6:
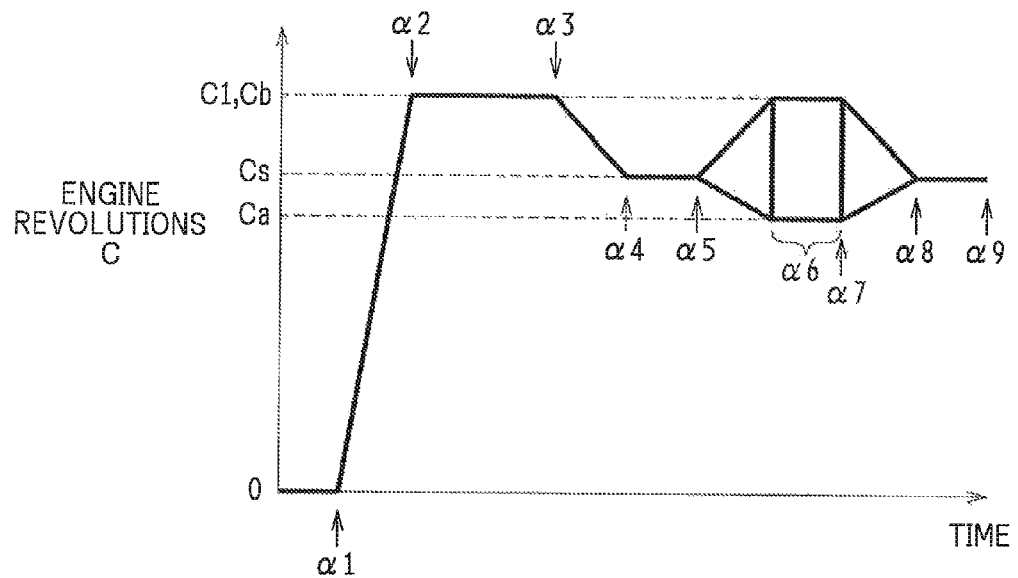
FIG. 6 is a timing chart illustrating one example of the control operation with respect to the engine revolutions regarding the compressor during a self-sustaining operation according to the first embodiment.
Figure 11:
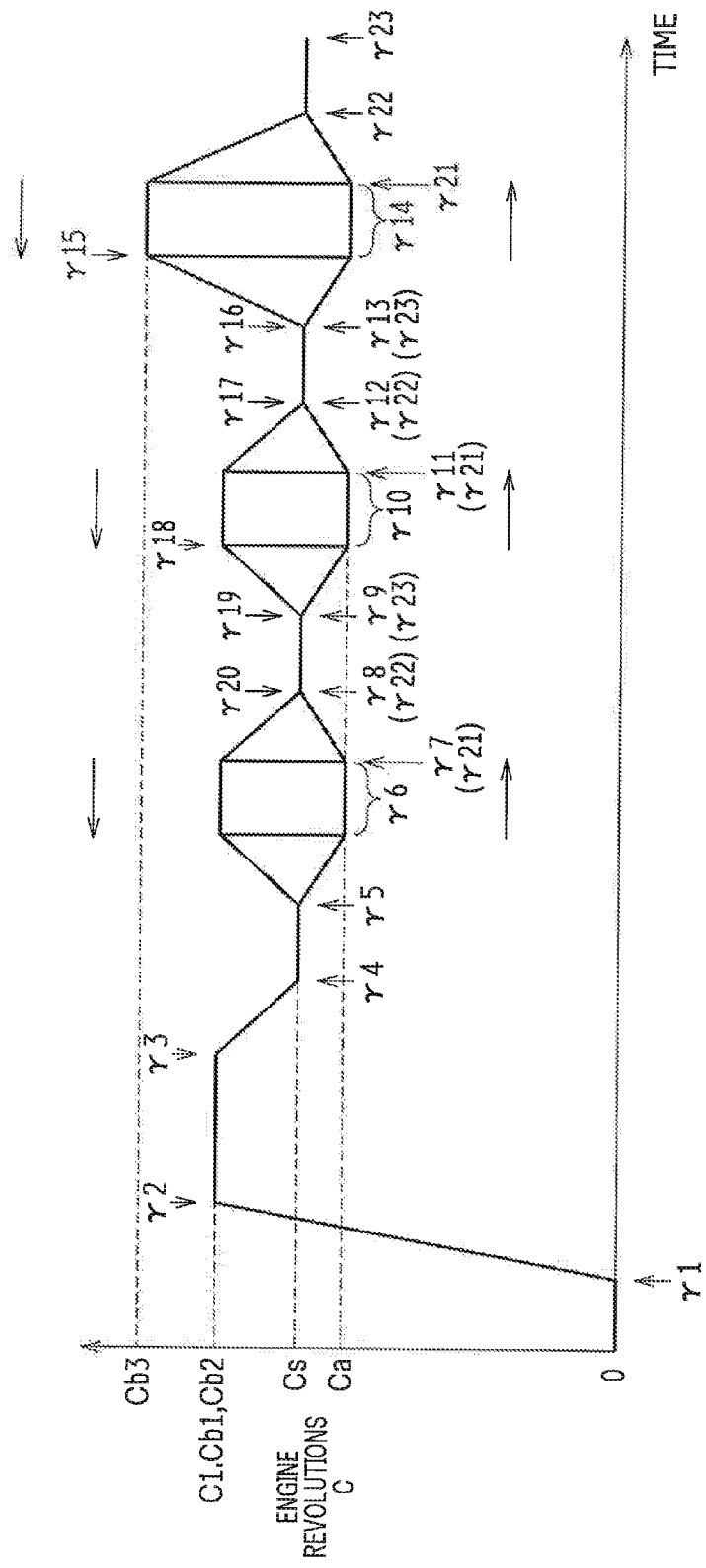
FIG. 11 is a timing chart illustrating one example of the control operation of the engine revolutions regarding the compressor during the self-sustaining operation according to the second embodiment.

That is, regarding the engine driven heat pump 100 according to the present embodiment, during the self-sustaining operation, when the compressor clutch 121 is switched from the OFF state to the ON state, or when the compressor clutch 121 is switched from the ON state to the OFF state, it is configured to set the engine revolutions C to reference revolutions Cs required for the generator 130 to supply the predetermined power (for example, 1600 rpm: revolution per minute) (see FIGS. 6 and 11 described later). Herein, the reference revolutions Cs can be revolutions to the extent that is not less than the minimum revolutions Ca that are taken into consideration of the reduction of the engine revolutions C at the time when the compressor clutch 121 is switched from the OFF state to the ON state, and the reference revolutions Cs can be revolutions to the extent that is not higher than the predetermined revolutions that are set in advance and taken into consideration of the excessive rotation of the engine 110 at the time when the compressor clutch 121 is switched from the ON state to the OFF state. In other words, the reference revolutions Cs are revolutions obtained by adding predetermined additional revolutions Cd (for example, 100 rpm) set in advance, in such a manner as not to be less than the minimum revolutions Ca in order to prevent the reduction of the engine revolutions C at the time when the compressor clutch 121 is switched from the OFF state to the ON state, and in such a manner as not to exceed the predetermined revolutions in order to prevent the excessive rotation of the engine 110 at the time when the compressor clutch 121 is switched from the ON state to the OFF state, to the minimum revolutions Ca (for example, 1500 rpm) required for the generator 130 to supply the predetermined power.

Thus, according to the engine driven heat pump 100 of the present embodiment, during the self-sustaining operation, when the compressor clutch 121 is switched from the OFF state to the ON state, or when the compressor clutch 121 is switched from the ON state to the OFF state, the engine revolutions C are set to the reference revolutions Cs required for the generator 130 to supply the predetermined power (for example, 1600 rpm), the control constitution of the engine revolutions C regarding drive, stoppage, increase and decrease in drive capacity of the compressor 120 during the self-sustaining operation can be provided. Furthermore, the engine revolutions C are set to the reference revolutions Cs required for the generator 130 to supply the predetermined power (for example, 1600 rpm) during the self-sustaining operation, so that the predetermined power or higher can be supplied from the generator 130 at all times, irrespective of a request of the heat pump operation (air conditioning in the example). Moreover, even when the compressor clutch 121 is switched from the ON state to the OFF state, and the load of the compressor 120 with respect to the engine 110 is eliminated (or in a case where the plurality of compressors 120 and the plurality of compressor clutches 121 are provided, even when the load of the compressor 120 with respect to the engine 110 is reduced), the excessive rotation of the engine 110 can be effectively prevented. Accordingly, the supply of power before or after the drive and stoppage of the compressor 120 can be stabilized.

Next, the control constitution of the engine revolutions C regarding the compressor 120 of the first embodiment, in which the single compressor 120 and the single compressor clutch 121 are provided, will be described. Subsequently, the control constitution of the engine revolutions C regarding the compressor 120 of the second embodiment, in which the plurality of compressors 120 and the plurality of compressor clutches 121 are provided, will be described.

First Embodiment: Case where Single Compressor is Provided

Figure 5:
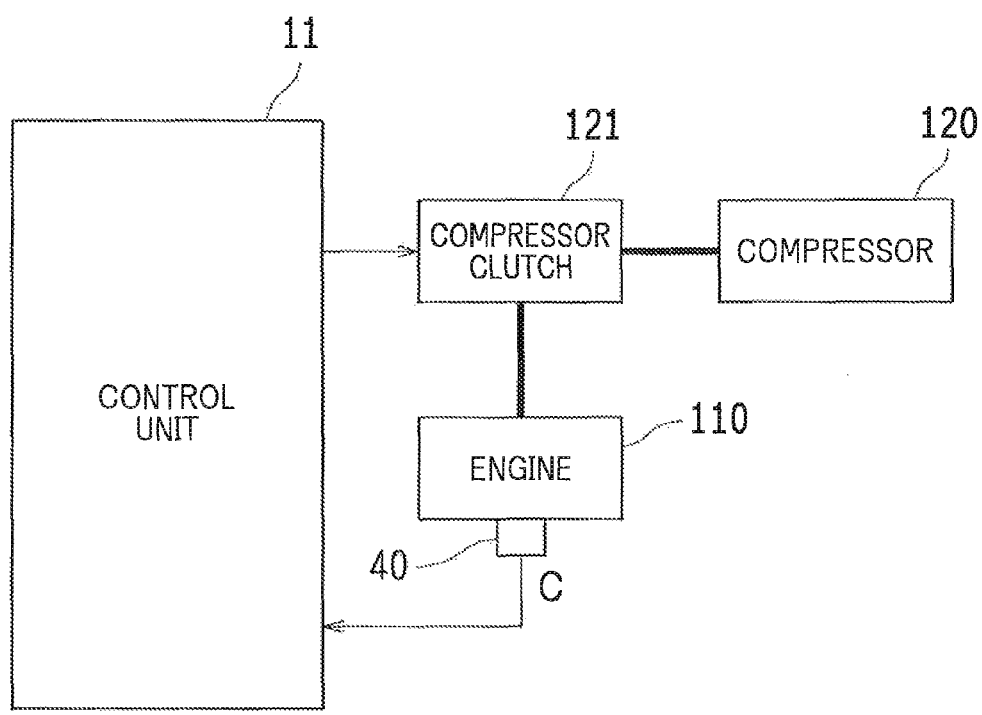
FIG. 5 is a system block diagram illustrating the control constitution of a first embodiment in which a single compressor and a single compressor clutch are provided.

FIG. 5 is a system block diagram illustrating the control constitution of the first embodiment in which the single compressor 120 and the single compressor clutch 121 are provided.

The engine driven heat pump 100 according to the first embodiment includes the single compressor 120 and the single compressor clutch 121 provided in the single compressor 120.

The compressor clutch 121 is connected to the output system of the control unit 11. Accordingly, when the control unit 11 provides indication that the compressor clutch 121 is brought into the ON state (specifically, when an ON signal which brings the compressor clutch 121 into the ON state is transmitted from the control unit 11), the compressor clutch 121 falls into the ON state, so that the compressor clutch 121 can transmit the rotational drive from the engine 110 to the compressor 120, whereas when the control unit 11 provides indication that the compressor clutch 121 is brought into the OFF state (specifically, when the transmission of the ON signal from the control unit 11 is stopped), the compressor clutch 121 falls into the OFF state, so that the compressor clutch 121 can cut off the transmission of the rotational drive from the engine 110 to the compressor 120.

The engine driven heat pump 100 further includes a revolution detector 40 that detects the engine revolutions C. The revolution detector 40 is connected to the input system of the control unit 11. The revolution detector 40 detects the engine revolutions C, whereby the control unit 11 is configured to control the engine 110 in such a manner that the engine revolutions C during power generation correspond to power generation revolutions C1 (for example, 2000 rpm) at which generation power generated by the generator 130 (specifically, power generation from the generator controller 19) can be supplied. It is noted that the control constitution of the engine revolutions C, with which the control unit 11 provides the engine 110, is similar to one conventionally known, and accordingly its description is omitted. This is similarly applied to the second embodiment described below.

Figure 7:
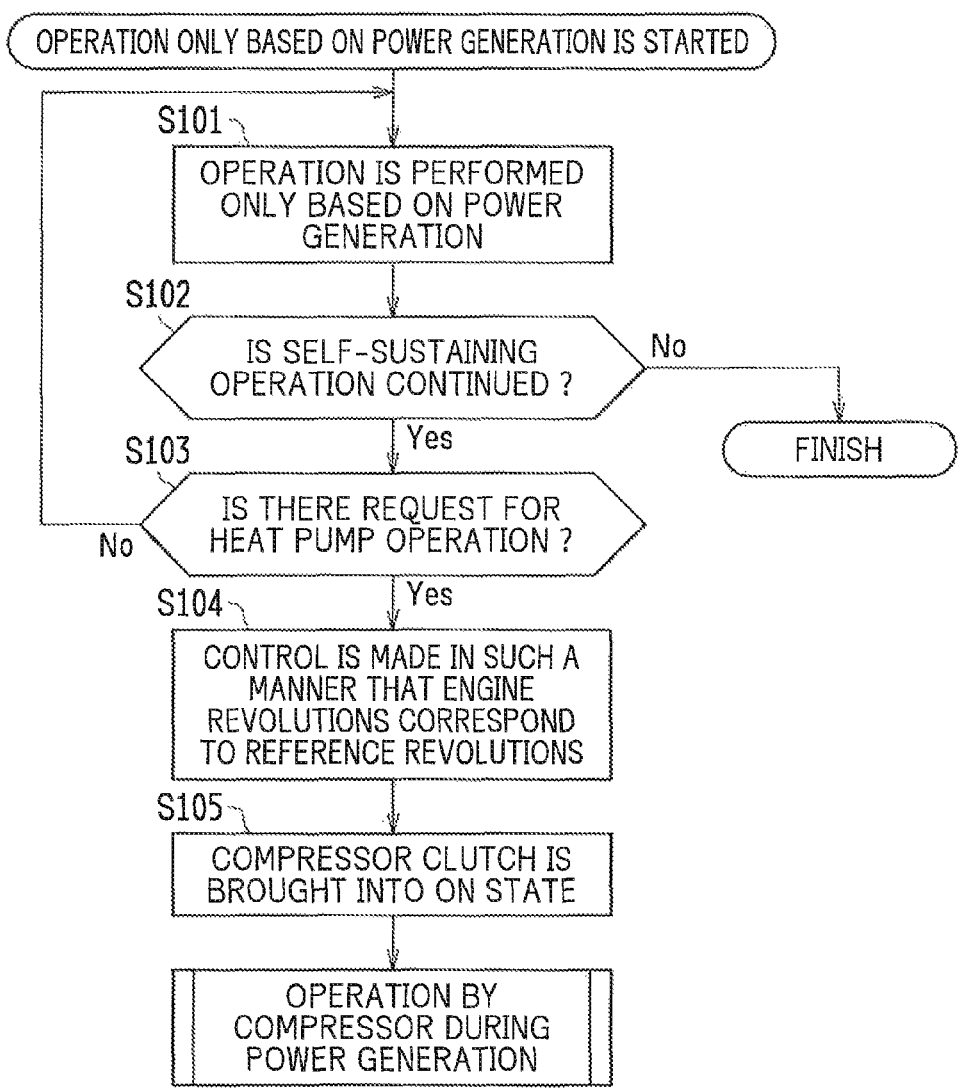
FIG. 7 is a flowchart illustrating one example of the control operation with respect to the engine revolutions regarding the compressor during the self-sustaining operation according to the first embodiment and a diagram illustrating the example of processing in operations only based on power generation.
Figure 8:
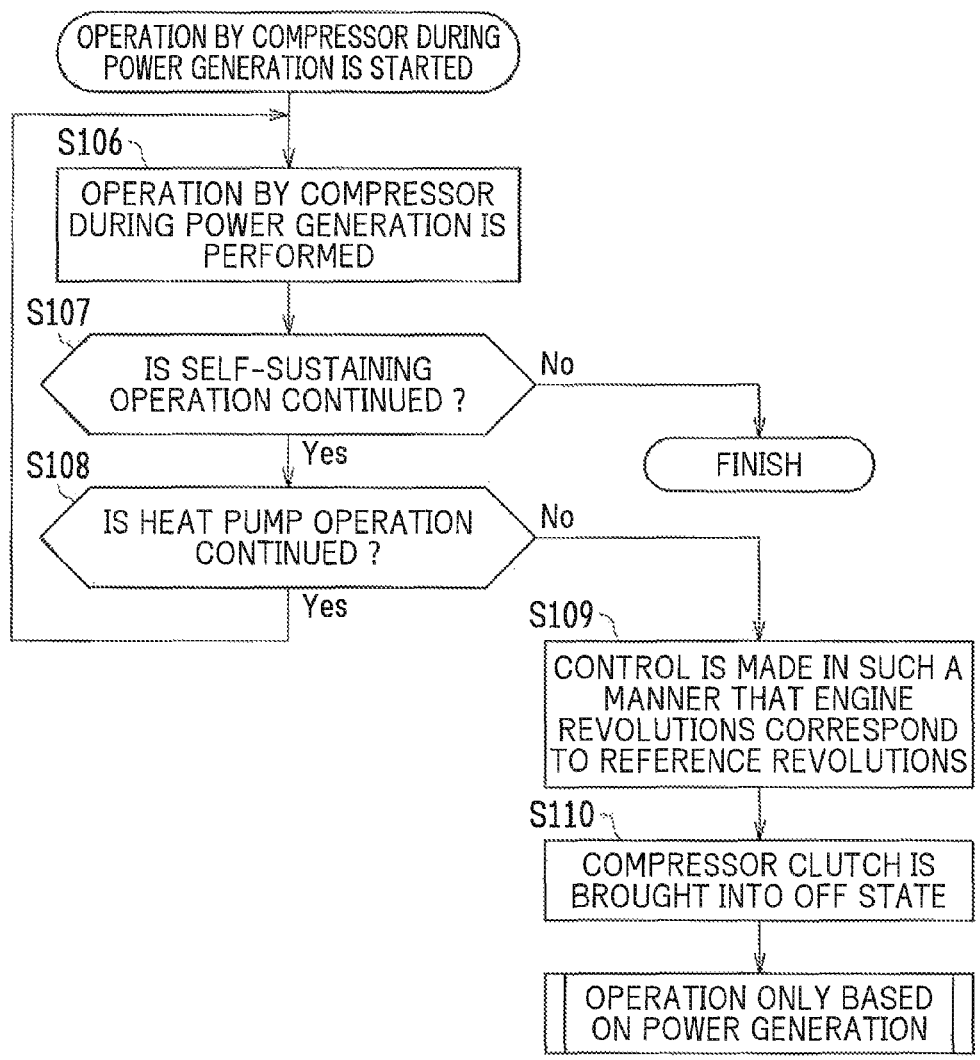
FIG. 8 is a flowchart illustrating one example of the control operation with respect to the engine revolutions regarding the compressor during the self-sustaining operation according to the first embodiment and a diagram illustrating the example of processing in the operation by the compressor during the power generation.

FIG. 6 is a timing chart illustrating one example of the control operation with respect to the engine revolutions C regarding the compressor 120 during the self-sustaining operation according to the first embodiment. Also, FIGS. 7 and 8 are flowcharts illustrating one example of the control operation with respect to the engine revolutions C regarding the compressor 120 during the self-sustaining operation according to the first embodiment. FIG. 7 represents the example of processing of operations performed only based on power generation. FIG. 8 represents the example of processing of operations performed by the compressor 120 during the power generation.

Regarding the engine driven heat pump 100 according to the first embodiment, the compressor clutch 121 is in the OFF state during the self-sustaining operation prior to the actuation of the engine 110. Then, when the engine 110 is actuated (see α1 in FIG. 6), the control unit 11 controls the engine 110 in such a manner that the engine revolutions C correspond to the power generation revolutions C1 (for example, 2000 rpm) (see α2 in FIG. 6) and performs the operation only based on the power generation (Step S101).

Next, the control unit 11 determines whether or not the self-sustaining operation is continued (Step S102). When the self-sustaining operation is continued (Step S102, YES), the processing proceeds to Step S103, whereas when the completion of the self-sustaining operation is indicated (Step S102, NO), the control operation is finished.

Subsequently, the control unit 11 determines whether or not there is a user's request (a user's instruction) for the heat pump operation (air conditioning in the example) (Step S103). When there is no request for the heat pump operation (Step S103, NO), the processing proceeds to Step S101, whereas when there is a request for the heat pump operation (see α3 in FIG. 6) (Step S103, YES), first, the control unit 11 controls the engine 110 in such a manner that the engine revolutions C correspond to the reference revolutions Cs (for example, 1600 rpm) (see α4 in FIG. 6) (Step S104, YES). Subsequently, the control unit 11 transmits an ON signal to the compressor clutch 121 and brings the compressor clutch 121 into the ON state (see α5 in FIG. 6) (Step S105). Accordingly, regarding the engine driven heat pump 100, the operation is performed by the compressor 120 during the power generation (Step S106 in FIG. 8), and the heat pump operation is performed based on the drive capacity of the compressor 120. At this time, the control unit 11 controls the engine 110 (see α6 in FIG. 6) in such a manner that, after the engine revolutions C continuously correspond to the reference revolutions Cs (for example, 1600 rpm) during a predetermined first duration time (for example, 5 seconds) subsequent to the switching of the clutch, the engine revolutions C fall into a range between the minimum revolutions Ca (for example, 1500 rpm) and the upper-limit revolutions Cb (for example, 2000 rpm) set in advance as the upper limit of the engine revolutions C during the power generation, in accordance with the load of the heat pump operation (load of air conditioning in the example).

Subsequently, the control unit 11 determines whether or not the self-sustaining operation is continued (Step S107). When the self-sustaining operation is continued (Step S107, YES), the processing proceeds to Step S108, whereas when the completion of the self-sustaining operation is indicated (Step S107, NO), the control operation is finished.

Subsequently, the control unit 11 determines whether or not the heat pump operation (air conditioning in the example) is continued (Step S108). When the heat pump operation is continued (Step S108, YES), the processing proceeds to Step S106, whereas when there is a request for stoppage of the heat pump operation (see α7 in FIG. 6) (Step S108, NO), first, the control unit 11 controls the engine 110 in such a manner that the engine revolutions C correspond to the reference revolutions Cs (for example, 1600 rpm) (see α8 in FIG. 6) (Step S109). Subsequently, the control unit 11 stops the transmission of the ON signal to the compressor clutch 121 and brings the compressor clutch 121 into the OFF state (see α9 in FIG. 6) (Step S110). Accordingly, in the engine driven heat pump 100, the heat pump operation is stopped. Then, the processing proceeds to Step S101 where the operation is performed only based on the power generation illustrated in FIG. 7.

Second Embodiment: Case where Plurality of Compressors are Provided

Figure 9:
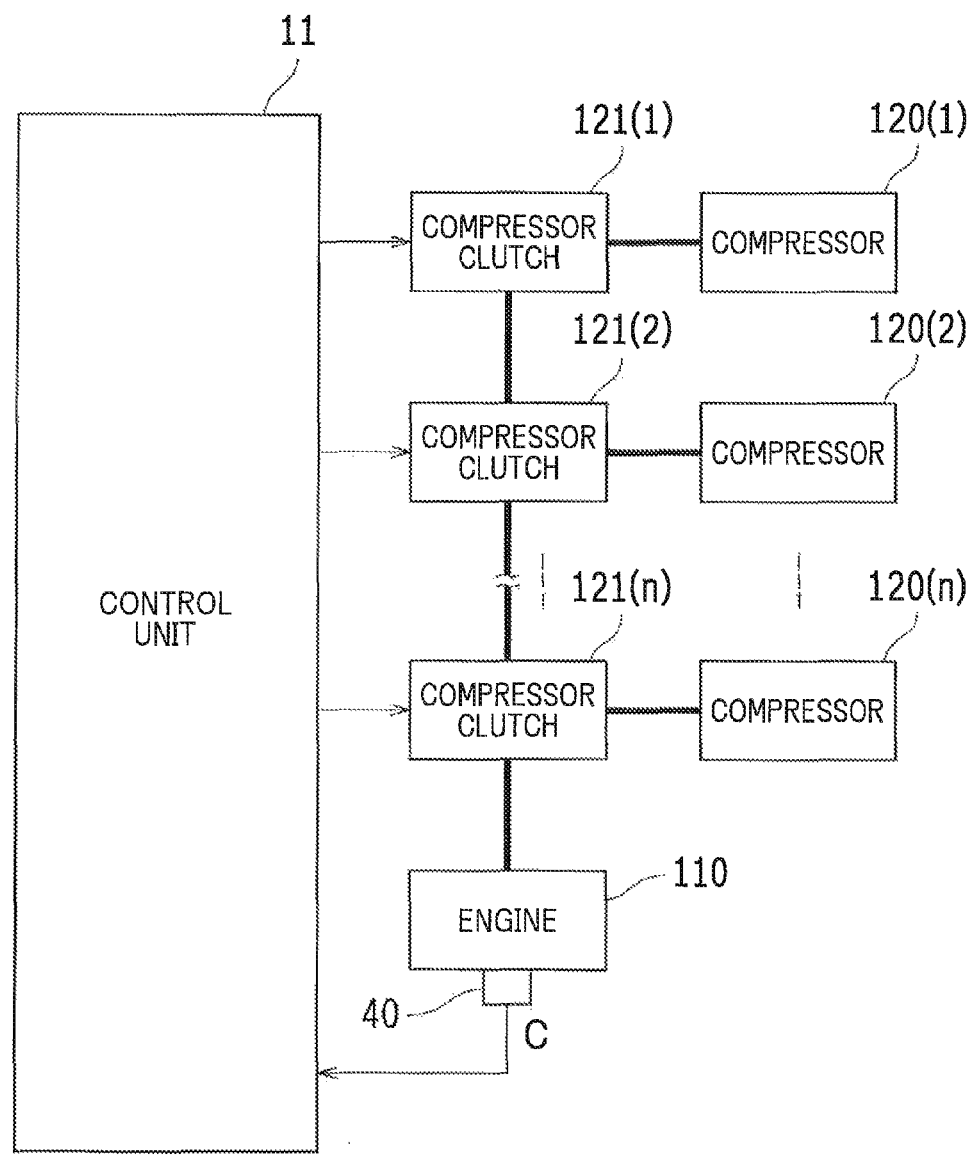
FIG. 9 is a system block diagram illustrating the control constitution of a second embodiment in which a plurality of compressors and a plurality of compressor clutches are provided.

FIG. 9 is a system block diagram illustrating the control constitution of the second embodiment in which the plurality of compressors 120 and the plurality of compressor clutches 121 are provided. It is noted that, in FIG. 9, the same numbers of the members illustrated in FIG. 5 are designated as the same references, and thereby duplicated descriptions are omitted.

The engine driven heat pump 100 according to the second embodiment includes a plurality of compressors 120(1) to 120($n$) (n is an integer of two or more) and a plurality of compressor clutches 121(1) to 121($n$) that are respectively provided in the compressors 120(1) to 120($n$).

The compressor clutches 121(1) to 121($n$) are connected to the output system of the control unit 11. Accordingly, when the control unit 11 provides indication that the compressor clutches 121(1) to 121($n$) are brought into the ON state (specifically, when the ON signal which brings the compressor clutches 121(1) to 121($n$) into the ON state is transmitted from the control unit 11), the compressor clutches 121(1) to 121($n$) fall into the ON state, so that the compressor clutches 121(1) to 121($n$) can transmit the rotational drive from the engine 110 to the compressor 120 corresponding to the compressor clutch 121 that is brought into the ON state, whereas when the control unit 11 provides indication that the compressor clutches 121(1) to 121($n$) are brought into the OFF state (specifically, when the transmission of the ON signal from the control unit 11 is stopped), the compressor clutches 121(1) to 121($n$) fall into the OFF state, so that the compressor clutches 121(1) to 121($n$) can cut off the transmission of the rotational drive from the engine 110 to the compressor 120 corresponding to the compressor clutch 121 that is brought into the OFF state.

Regarding the engine driven heat pump 100 according to the second embodiment, the control unit 11 can control the plurality of compressor clutches 121(1) to 121($n$) in such a manner that the drive output is placed in ascending order or in descending order, out of the drive output in a case where each compressor is operated in an independent manner with respect to the plurality of compressors 120(1) to 120($n$), and the drive output in a case where at least two compressors out of the plurality of compressors 120(1) to 120($n$) are operated in a combined manner. In this case, preferably, the drive output of the plurality of compressor clutches 121(1) to 121($n$) is different from each other.

For example, when it is assumed that the drive output of the first compressor 120(1) is 1 kW, and the drive output of the second compressor 120(2) is 1.5 kW, and the drive output of the third compressor 120(3) is 2 kW, the control unit 11 can control a first compressor clutch 121(1), a second compressor clutch 121(2), and a third compressor clutch 121(3) in order to place the drive output in ascending order in such a manner that only the first compressor 120(1) is driven (drive output: 1 kW), and subsequently, only the second compressor 120(2) is driven (drive output: 1.5 kW), and subsequently, only the third compressor 120(3) is driven (drive output: 2 kW), and subsequently, only the first compressor 120(1) and the second compressor 120(2) are both driven (drive output: 2.5 kW), and subsequently, only the first compressor 120(1) and the third compressor 120(3) are both driven (drive output: 3 kW), and subsequently, only the second compressor 120(2) and the third compressor 120(3) are both driven (drive output: 3.5 kW), and lastly all the compressors 120(1) to 120(3) are driven (drive output: 4.5 kW). In contrast, in the case of the descending order, the control unit 11 can control the first compressor clutch 121(1), the second compressor clutch 121(2), and the third compressor clutch 121(3) in reverse order of the above-mentioned description.

Needless to say, while controlling the compressor clutches 121(1) to 121($n$) in such a manner that the drive output of the compressors 120(1) to 120($n$) is increased, the control unit 11 can control the compressor clutches 121(1) to 121($n$) in such a manner that the drive output of the compressors 120(1) to 120($n$) is decreased. While controlling the compressor clutches 121(1) to 121($n$) in such a manner that the drive output of the compressors 120(1) to 120($n$) is decreased, the control unit 11 can control the compressor clutches 121(1) to 121($n$) in such a manner that the drive output of the compressors 120(1) to 120($n$) is increased.

(During Supply of System Power)

Incidentally, during the supply of the system power, the system power is supplied from the system E. Accordingly, regarding the control operation of the engine revolutions C with regard to the compressors 120(1) to 120($n$) in the ordinary operational mode, the engine revolutions C need not always be equal to or higher than the minimum revolutions Ca.

Figure 10:
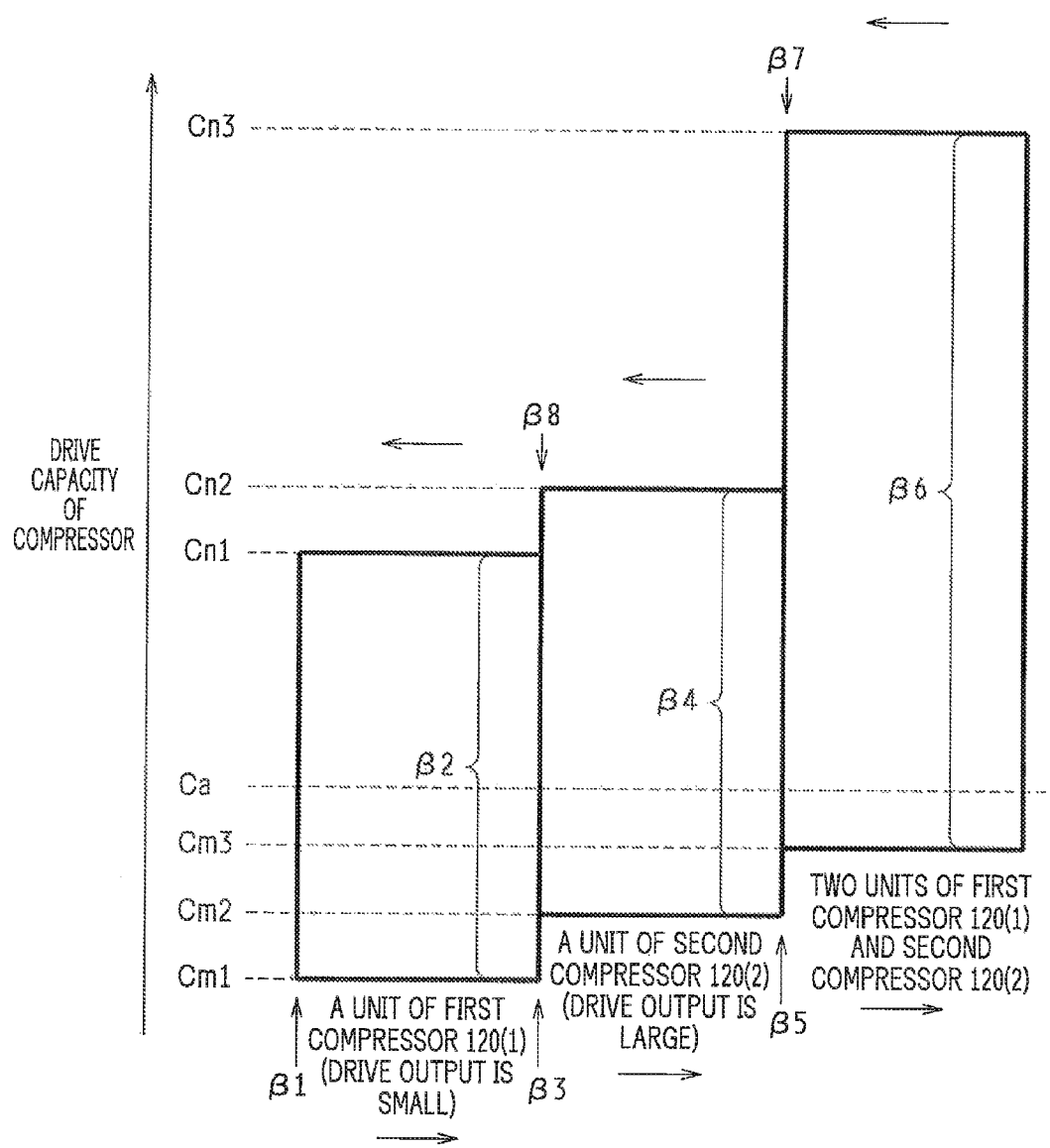
FIG. 10 is an explanatory diagram illustrating one example of the control operation of the engine revolutions with regard to the drive range of the compressor in an ordinary operational mode during the supply of system power.

FIG. 10 is an explanatory diagram illustrating one example of the control operation of the engine revolutions C with regard to the drive range of the compressor 120 in the ordinary operational mode during the supply of the system power.

In the control operation in the ordinary operational mode during the supply of the system power illustrated in FIG. 10, the number of compressors 120 and the number of compressor clutches 121 are each two (which is referred to as a first compressor 120(1) and a second compressor 120(2), and a first compressor clutch 121(1) and a second compressor clutch 121(2) in the description), and the drive output of the first compressor 120(1) is lower than the drive output of the second compressor 120(2). The specific descriptions are exemplified below by a case where the first compressor 120(1) is independently operated, a case where the second compressor 120(2) is independently operated, and a case where both the first compressor 120(1) and the second compressor 120(2) are operated.

Herein, regarding the engine revolutions C, first minimum revolutions Cm1 and first maximum revolutions Cn1 in the case where the first compressor 120(1) is independently operated are set in advance. Further, second minimum revolutions Cm2, which are larger than the first minimum revolutions Cm1 (second minimum revolutions Cm2>first minimum revolutions Cm1), and second maximum revolutions Cn2, which are larger than the first maximum revolutions Cn1 (second maximum revolutions Cn2>first maximum revolutions Cn1), in the case where the second compressor 120(2) is independently operated, are set in advance. Further, third minimum revolutions Cm3, which are larger than the second minimum revolutions Cm2 (third minimum revolutions Cm3>second minimum revolutions Cm2), and third maximum revolutions Cn3, which are larger than the second maximum revolutions Cn2 (third maximum revolutions Cn3>second maximum revolutions Cn2), in the case where both the first compressor 120(1) and the second compressor 120(2) are operated, are set in advance. It is noted that the first minimum revolutions Cm1, the second minimum revolutions Cm2, and the third minimum revolutions Cm3 are lower than the minimum revolutions Ca (for example, 1500 rpm).

Regarding the engine driven heat pump 100, when the heat pump operation (air conditioning in the example) is performed in the ordinary operational mode during the supply of the system power, the control unit 11 brings only the first compressor clutch 121(1) into the ON state (see β3 in FIG. 10). Accordingly, regarding the engine driven heat pump 100, the heat pump operation is performed based on the drive capacity of the first compressor 120(1). At this time, the control unit 11 controls the engine 110 in accordance with the load of the heat pump operation (load of air conditioning in the example) in such a manner that the engine revolutions C fall into a range between the first minimum revolutions Cm1 and the first maximum revolutions Cn1 (see β2 in FIG. 10).

When the load of the heat pump operation exceeds the maximum drive capacity (drive capacity in a case where the engine revolutions C correspond to the first maximum revolutions Cn1) in the operation by use of the first compressor 120(1), the control unit 11 brings only the second compressor clutch 121(2) into the ON state (see β3 in FIG. 10). Accordingly, regarding the engine driven heat pump 100, the heat pump operation is performed based on the drive capacity of the second compressor 120(2), which is larger than the drive capacity of the first compressor 120(1). At this time, the control unit 11 controls the engine 110 in accordance with the load of the heat pump operation in such a manner that the engine revolutions C fall into a range between the second minimum revolutions Cm2 and the second maximum revolutions Cn2 (see β4 in FIG. 10).

When the load of the heat pump operation exceeds the maximum drive capacity (drive capacity in a case where the engine revolutions C correspond to the second maximum revolutions Cn2) in the operation by use of the second compressor 120(2), the control unit 11 brings both the first compressor clutch 121(1) and the second compressor clutch 121(2) into the ON state (see β5 in FIG. 10). Accordingly, regarding the engine driven heat pump 100, the heat pump operation is performed based on the drive capacity of both the first compressor 120(1) and the second compressor 120(2), which is larger than the drive capacity of the second compressor 120(2). At this time, the control unit 11 controls the engine 110 in accordance with the load of the heat pump operation in such a manner that the engine revolutions C fall into a range between the third minimum revolutions Cm3 and the third maximum revolutions Cn3 (see β6 in FIG. 10).

Also, when the load of the heat pump operation is less than the minimum drive capacity (drive capacity in a case where the engine revolutions C correspond to the third minimum revolutions Cm3) in the operation by use of the first compressor 120(1) and the second compressor 120(2), the control unit 11 brings only the second compressor clutch 121(2) into the ON state (see β7 in FIG. 10). Accordingly, regarding the engine driven heat pump 100, the heat pump operation is performed based on the drive capacity of the second compressor 120(2). At this time, the control unit 11 controls the engine 110 in accordance with the load of the heat pump operation in such a manner that the engine revolutions C fall into a range between the second minimum revolutions Cm2 and the second maximum revolutions Cn2 (see β4 in FIG. 10).

When the load of the heat pump operation is less than the minimum drive capacity (drive capacity in a case where the engine revolutions C correspond to the second minimum revolutions Cm2) in the operation by use of the second compressor 120(2), the control unit 11 brings only the first compressor clutch 121(1) into the ON state (see β8 in FIG. 10). Accordingly, regarding the engine driven heat pump 100, the heat pump operation is performed based on the drive capacity of the first compressor 120(1). At this time, the control unit 11 controls the engine 110 in accordance with the load of the heat pump operation in such a manner that the engine revolutions C fall into a range between the first minimum revolutions Cm1 and the first maximum revolutions Cn1 (see β2 in FIG. 10).

Thus, in the control operation of the engine revolutions C regarding the compressors 120(1) to 120(n) in the ordinary operational mode during the supply of the system power, the first minimum revolutions Cm1, the second minimum revolutions Cm2, and the third minimum revolutions Cm3 are lower than the minimum revolutions Ca (for example, 1500 rpm), so that the control operation of the engine revolutions C regarding the compressors 120(1) to 120(n) in the ordinary operational mode during the supply of the system power cannot be applied to the control operation of the engine revolutions C regarding the compressors 120(1) to 120(n) during the self-sustaining operation as it is.

(During Self-Sustaining Operation)

Accordingly, the control operation of the engine revolutions C regarding the compressors 120(1) to 120(n) during the self-sustaining operation is provided as follows.

Figure 12:
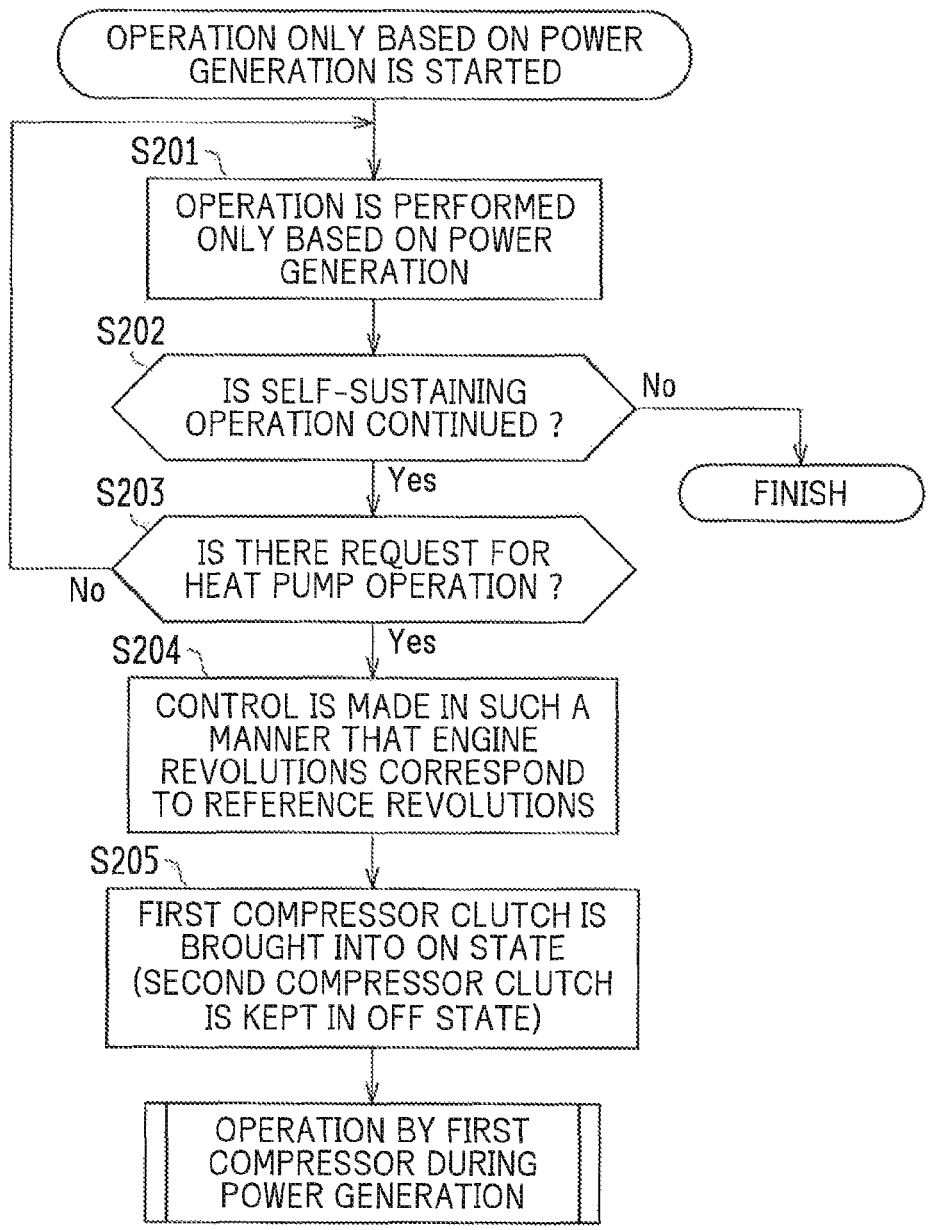
FIG. 12 is a flowchart illustrating one example of the control operation of the engine revolutions regarding the compressors during the self-sustaining operation according to the second embodiment and a diagram illustrating the example of processing in the operation only based on the power generation.
Figure 13:
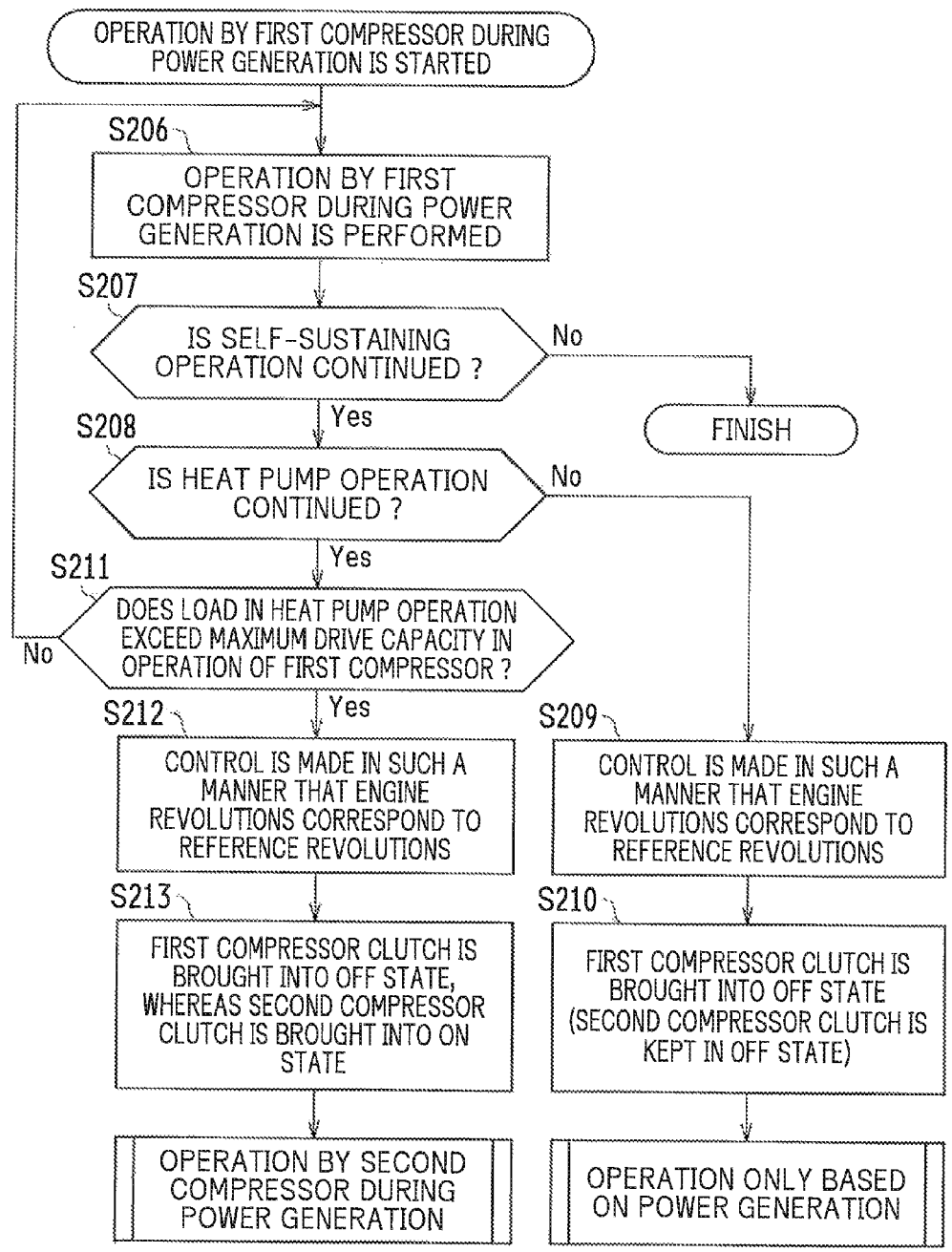
FIG. 13 is a flowchart illustrating one example of the control operation of the engine revolutions regarding the compressor during the self-sustaining operation according to the second embodiment and a diagram illustrating the example of processing in the operation based on a first compressor during the power generation.
Figure 14:
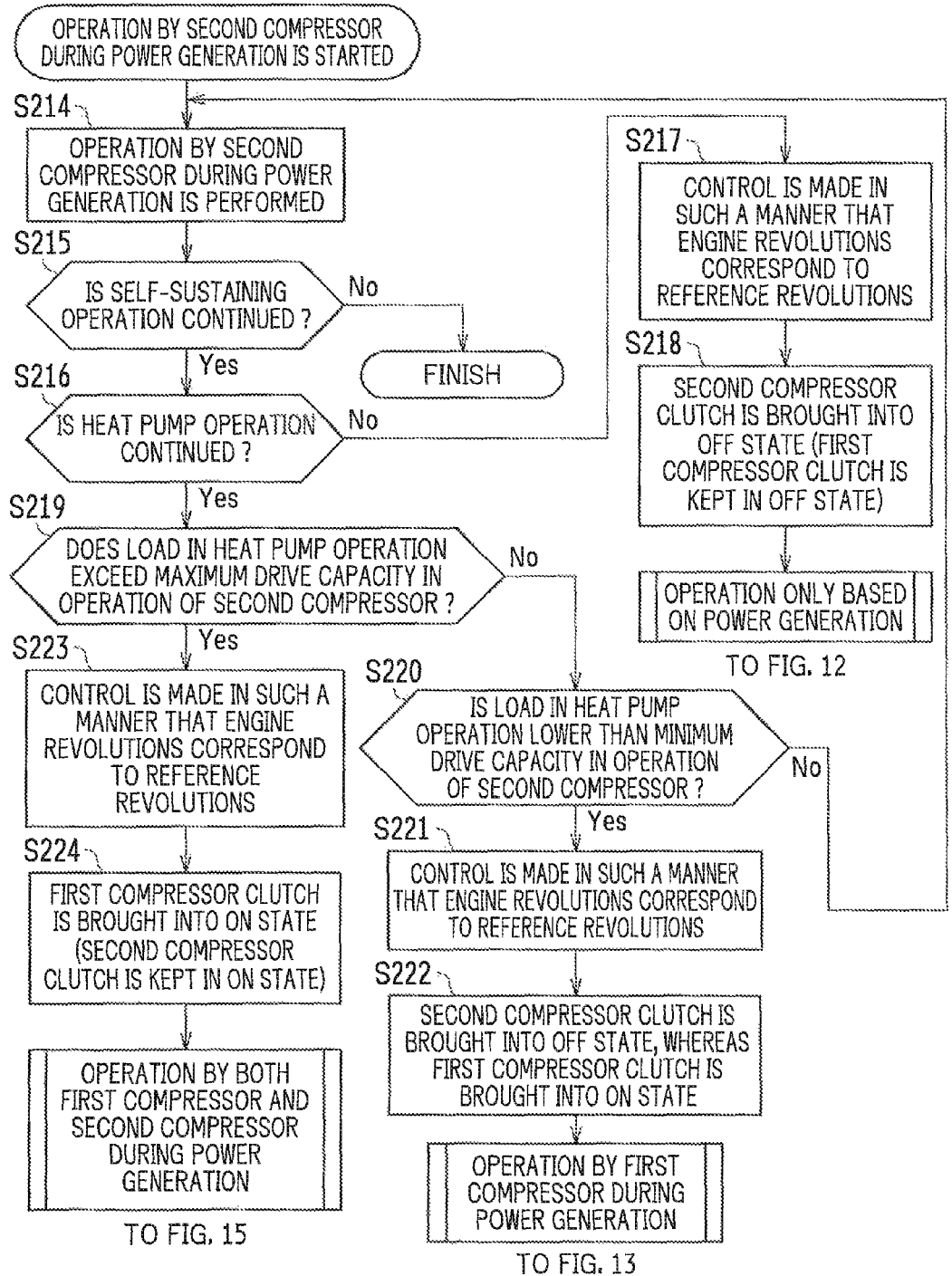
FIG. 14 is a flowchart illustrating one example of the control operation of the engine revolutions regarding the compressor during the self-sustaining operation according to the second embodiment and a diagram illustrating the example of processing in the operation based on a second compressor during the power generation.
Figure 15:
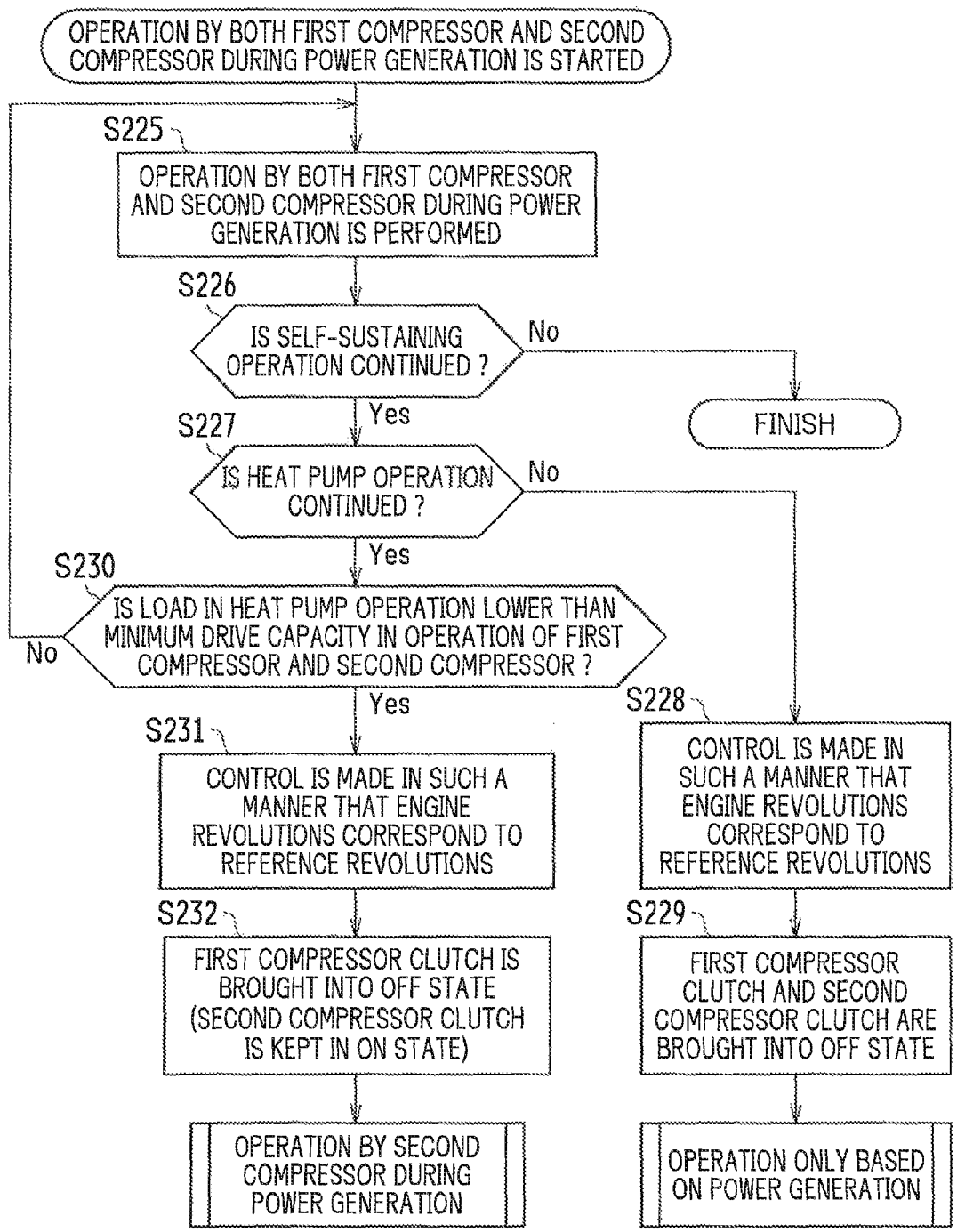
FIG. 15 is a flowchart illustrating one example of the control operation of the engine revolutions regarding the compressor during the self-sustaining operation according to the second embodiment and a diagram illustrating the example of processing in the operation based on both the first compressor and the second compressor during the power generation.

FIG. 11 is a timing chart illustrating one example of the control operation of the engine revolutions C regarding the compressors 120 during the self-sustaining operation according to the second embodiment. Also, FIGS. 12 to 15 are flowcharts illustrating one example of the control operation of the engine revolutions C regarding the compressors 120 during the self-sustaining operation according to the second embodiment. FIG. 12 represents the example of processing in the operation only based on the power generation. FIG. 13 represents the example of processing in the operation based on the first compressor 120(1) during the power generation. FIG. 14 represents the example of processing in the operation based on the second compressor 120(2) during the power generation. FIG. 15 represents the example of processing in the operation based on both the first compressor 120(1) and the second compressor 120(2) during the power generation.

Regarding the engine driven heat pump 100 according to the second embodiment, prior to the actuation of the engine 110, both the first compressor clutch 121(1) and the second compressor clutch 121(2) are in the OFF state during the self-sustaining operation. Then, when the engine 110 is actuated (see γ1 in FIG. 11), the control unit 11 controls the engine 110 in such a manner that the engine revolutions C correspond to the power generation revolutions C1 (for example, 2000 rpm) (see γ2 in FIG. 11) and performs the operation only based on the power generation (Step S201).

Subsequently, the control unit 11 determines whether or not the self-sustaining operation is continued (Step S202). When the self-sustaining operation is continued (Step S202, YES), the processing proceeds to Step S203, whereas when the completion of the self-sustaining operation is indicated (Step S202, NO), the control operation is finished.

Subsequently, the control unit 11 determines whether or not there is a user's request (a user's instruction) for the heat pump operation (air conditioning in the example) (Step S203). When there is no request for the heat pump operation (Step S203, NO), the processing proceeds to Step S201, whereas when there is a request for the heat pump operation (see γ3 in FIG. 11) (Step S203, YES), first, the control unit 11 controls the engine 110 in such a manner that the engine revolutions C correspond to the reference revolutions Cs (for example, 1600 rpm) (see γ4 in FIG. 11) (Step S204). Subsequently, the control unit 11 transmits the ON signal to the first compressor clutch 121(1) and brings the first compressor clutch 121(1) into the ON state (see γ5 in FIG. 11) (Step S205). At this time, the second compressor clutch 121(2) is kept in the OFF state. Accordingly, regarding the engine driven heat pump 100, the operation is performed by the first compressor 120(1) during the power generation (Step S206 in FIG. 13), and the heat pump operation is performed based on the drive capacity of the compressor 120(1). At this time, the control unit 11 controls the engine 110 (see γ6 in FIG. 11) in such a manner that, after the engine revolutions C continuously correspond to the reference revolutions Cs (for example, 1600 rpm) during the predetermined first duration time (for example, 5 seconds) subsequent to the switching of the clutch, the engine revolutions C fall into a range between the minimum revolutions Ca (for example, 1500 rpm) and a first upper-limit revolutions Cb1 (for example, 2000 rpm) set in advance as the upper limit of the engine revolutions C during the power generation, in accordance with the load of the heat pump operation (load of air conditioning in the example).

Subsequently, the control unit 11 determines whether or not the self-sustaining operation is continued (Step S207). When the self-sustaining operation is continued (Step S207, YES), the processing proceeds to Step S208, whereas when the completion of the self-sustaining operation is indicated (Step S207, NO), the control operation is finished.

Subsequently, the control unit 11 determines whether or not the heat pump operation is continued (Step S208). When the heat pump operation is continued (Step S208, YES), the processing proceeds to Step S211, whereas when there is a request for stoppage of the heat pump operation (see γ21 in FIG. 11) (Step S208, NO), first, the control unit 11 controls the engine 110 in such a manner that the engine revolutions C correspond to the reference revolutions Cs (for example, 1600 rpm) (see γ22 in FIG. 11) (Step S209). Subsequently, the control unit 11 stops the transmission of the ON signal to the first compressor clutch 121(1) and brings the first compressor clutch 121(1) into the OFF state (see γ23 in FIG. 11) (Step S210). At this time, the second compressor clutch 121(2) is kept in the OFF state. Accordingly, in the engine driven heat pump 100, the heat pump operation is stopped. Then, the processing proceeds to Step S201 where the operation is performed only based on the power generation illustrated in FIG. 12.

When the heat pump operation is continued (Step S208, YES), and the load of the heat pump operation is equal to or lower than the maximum drive capacity (drive capacity in a case where the engine revolutions C correspond to the first upper-limit revolutions Cb1 (for example, 2000 rpm)) in the operation of the first compressor 120(1) (Step S211, NO), the processing at Steps S206 to S211 is repeated. When the load of the heat pump operation exceeds the maximum drive capacity of the operation of the first compressor 120(1) (see β7 in FIG. 11) (Step S211, YES), first, the control unit 11 controls the engine 110 in such a manner that the engine revolutions C correspond to the reference revolutions Cs (for example, 1600 rpm) (see β8 in FIG. 11) (Step S212). Subsequently, the control unit 11 stops the transmission of the ON signal to the first compressor clutch 121(1) and brings the first compressor clutch 121(1) into the OFF state, whereas the control unit 11 transmits the ON signal to the second compressor clutch 121(2) and brings the second compressor clutch 121(2) into the ON state (see γ9 in FIG. 11) (Step S213). Accordingly, regarding the engine driven heat pump 100, the operation is performed by the second compressor 120(2) during the power generation (Step S214 in FIG. 14), whereby the heat pump operation is performed based on the drive capacity of the second compressor 120(2). At this time, the control unit 11 controls the engine 110 (see γ10 in FIG. 11) in such a manner that, after the engine revolutions C continuously correspond to the reference revolutions Cs (for example, 1600 rpm) during the predetermined first duration time (for example, 5 seconds) subsequent to the switching of the clutch, the engine revolutions C fall into a range between the minimum revolutions Ca (for example, 1500 rpm) and a second upper-limit revolutions Cb2 (for example, 1950 rpm) set in advance as the upper limit of the engine revolutions C during the power generation, in accordance with the load of the heat pump operation.

Subsequently, the control unit 11 determines whether or not the self-sustaining operation is continued (Step S215). When the self-sustaining operation is continued (Step S215, YES), the processing proceeds to Step S216, whereas when the completion of the self-sustaining operation is indicated (Step S215, NO), the control operation is finished.

Subsequently, the control unit 11 determines whether or not the heat pump operation is continued (Step S216). When the heat pump operation is continued (Step S216, YES), the processing proceeds to Step S219, whereas when there is a request for stoppage of the heat pump operation (see γ21 in FIG. 11) (Step S216, NO), first, the control unit 11 controls the engine 110 in such a manner that the engine revolutions C correspond to the reference revolutions Cs (for example, 1600 rpm) (see γ22 in FIG. 11) (Step S217). Subsequently, the control unit 11 stops the transmission of the ON signal to the second compressor clutch 121(2) and brings the second compressor clutch 121(2) into the OFF state (see β23 in FIG. 11) (Step S218). At this time, the first compressor clutch 121(1) is kept in the OFF state. Accordingly, regarding the engine driven heat pump 100, the heat pump operation is stopped. Then, the processing proceeds to Step S201 where the operation is performed only based on the power generation illustrated in FIG. 12.

When the heat pump operation is continued (Step S216, YES), and the load of the heat pump operation is equal to or lower than the maximum drive capacity (drive capacity in a case where the engine revolutions C correspond to the second upper-limit revolutions Cb2 (for example, 1950 rpm)) in the operation of the second compressor 120(2) (Step S219, NO), the processing proceeds to Step S220.

At Step S220, when the load of the heat pump operation is less than the minimum drive capacity in the operation of the second compressor 120(2) (see β18 in FIG. 11) (Step S220, YES), first, the control unit 11 controls the engine 110 in such a manner that the engine revolutions C correspond to the reference revolutions Cs (for example, 1600 rpm) (see γ19 in FIG. 11) (Step S221). Subsequently, the control unit 11 stops the transmission of the ON signal to the second compressor clutch 121(2) and brings the second compressor clutch 121(2) into the OFF state, whereas the control unit 11 transmits the ON signal to the first compressor clutch 121(1) and brings the first compressor clutch 121(1) into the ON state (see γ20 in FIG. 11) (Step S222). Accordingly, regarding the engine driven heat pump 100, the operation is performed by the first compressor 120(1) during the power generation (Step S206 in FIG. 13), whereby the heat pump operation is performed based on the drive capacity of the first compressor 120(1). At this time, the control unit 11 controls the engine 110 (see γ6 in FIG. 11) in such a manner that, after the engine revolutions C continuously correspond to the reference revolutions Cs (for example, 1600 rpm) during the predetermined second duration time (for example, one second) subsequent to the switching of the clutch, the engine revolutions C fall into a range between the minimum revolutions Ca (for example, 1500 rpm) and the first upper-limit revolutions Cb1 of the first compressor 120(1) (for example, 2000 rpm) set in advance, in accordance with the load of the heat pump operation.

At Step S220, when the load of the heat pump operation is equal to or higher than the minimum drive capacity of the operation of the second compressor 120(2) (Step S220, NO), the processing proceeds to Step S214.

In contrast, at Step S219, when the load of the heat pump operation exceeds the maximum drive capacity of the operation of the second compressor 120(2) (see β11 in FIG. 11) (Step S219, YES), first, the control unit 11 controls the engine 110 in such a manner that the engine revolutions C correspond to the reference revolutions Cs (for example, 1600 rpm) (see β12 in FIG. 11) (Step S223). Subsequently, the control unit 11 transmits the ON signal to the first compressor clutch 121(1) and brings the first compressor clutch 121(1) into the ON state (see β13 in FIG. 11) (Step S224). At this time, the second compressor clutch 121(2) is kept in the ON state. Accordingly, regarding the engine driven heat pump 100, the operation is performed by use of both the first compressor 120(1) and the second compressor 120(2) during the power generation (Step S225 in FIG. 15), whereby the heat pump operation is performed based on the drive capacity of the first compressor 120(1) and the second compressor 120(2). At this time, the control unit 11 controls the engine 110 (see γ14 in FIG. 11) in such a manner that, after the engine revolutions C continuously correspond to the reference revolutions Cs (for example, 1600 rpm) during the predetermined first duration time (for example, 5 seconds) subsequent to the switching of the clutch, the engine revolutions C fall into a range between the minimum revolutions Ca (for example, 1500 rpm) and a third upper-limit revolutions Cb3 (for example, 2650 rpm) set in advance as the upper limit of the engine revolutions C during the power generation, in accordance with the load of the heat pump operation.

Subsequently, the control unit 11 determines whether or not the self-sustaining operation is continued (Step S226). When the self-sustaining operation is continued (Step S226, YES), the processing proceeds to Step S227, whereas when the completion of the self-sustaining operation is indicated (Step S226, NO), the control operation is finished.

Subsequently, the control unit 11 determines whether or not the heat pump operation is continued (Step S227). When the heat pump operation is continued (Step S227, YES), the processing proceeds to Step S230, whereas when there is a request for stoppage of the heat pump operation (see γ21 in FIG. 11) (Step S227, NO), first, the control unit 11 controls the engine 110 in such a manner that the engine revolutions C correspond to the reference revolutions Cs (for example, 1600 rpm) (see γ22 in FIG. 11) (Step S228). Subsequently, the control unit 11 stops the transmission of the ON signal to the second compressor clutch 121(2) and brings the first compressor clutch 121(1) and the second compressor clutch 121(2) into the OFF state (see γ23 in FIG. 11) (Step S229). Accordingly, regarding the engine driven heat pump 100, the heat pump operation is stopped. Then, the processing proceeds to Step S201 where the operation is performed only based on the power generation illustrated in FIG. 12.

When the heat pump operation is continued (Step S227, YES), and the load of the heat pump operation is equal to or higher than the minimum drive capacity (drive capacity in a case where the engine revolutions C correspond to the minimum revolutions Ca (for example, 1500 rpm)) in the operation by use of the first compressor 120(1) and the second compressor 120(2) (Step S230, NO), the processing proceeds to Step S225.

At Step S230, when the load of the heat pump operation is less than the minimum drive capacity in the operation of the first compressor 120(1) and the second compressor 120(2) (see γ15 in FIG. 11) (Step S230, YES), first, the control unit 11 controls the engine 110 in such a manner that the engine revolutions C correspond to the reference revolutions Cs (for example, 1600 rpm) (see γ16 in FIG. 11) (Step S231). Subsequently, the control unit 11 stops the transmission of the ON signal to the first compressor clutch 121(1) and brings the first compressor clutch 121(1) into the OFF state (see γ17 in FIG. 11) (Step S232). At this time, the second compressor clutch 121(2) is kept in the ON state. Accordingly, regarding the engine driven heat pump 100, the operation is performed by the second compressor 120(2) during the power generation (Step S214 in FIG. 14), whereby the heat pump operation is performed based on the drive capacity of the second compressor 120(2). At this time, the control unit 11 controls the engine 110 (see γ10 in FIG. 11) in such a manner that, after the engine revolutions C continuously correspond to the reference revolutions Cs (for example, 1600 rpm) during the predetermined second duration time (for example, one second) subsequent to the switching of the clutch, the engine revolutions C fall into a range between the minimum revolutions Ca (for example, 1500 rpm) and the second upper-limit revolutions Cb2 of the second compressor 120(2) (for example, 1950 rpm) set in advance, in accordance with the load of the heat pump operation.

In the second embodiment, the case has been described where the number of compressors 120 and the number of compressor clutches 121 are each two. However, a case may be similarly applied where the number of compressors 120 and the number of compressor clutches 121 are each three or more.

As described above, regarding the engine driven heat pump 100 according to the second embodiment, the plurality of compressors 120(1) to 120(n) are provided, and the plurality of compressor clutches 121(1) to 121(n) are respectively provided in each of the compressors 120(1) to 120(n), and when the number of compressor clutches 121(1) to 121(n) to be connected is increased or decreased during the self-sustaining operation, the engine revolutions C are set to the reference revolutions Cs (for example, 1600 rpm) required for the generator 130 to supply the predetermined power, so that the predetermined power or higher can be supplied from the generator 130 at all times, irrespective of a request of the heat pump operation (air conditioning in the example), and accordingly, the supply of power before or after the drive and stoppage of respective compressors 120(1) to 120(n) can be stabilized. Also, even when the compressors 120(1) to 120(n) are each switched from the ON state to the OFF state, and the load of the compressors 120(1) to 120(n) with respect to the engine 110 is eliminated (or reduced), the excessive rotation of the engine 110 can be effectively prevented by setting the engine revolutions C to the reference revolutions Cs (for example, 1600 rpm). Accordingly, the supply of power at the time of the stoppage of the compressors 120(1) to 120(n) can be stabilized.

The present invention is not limited to the above-mentioned embodiments, but can be executed in various forms. Accordingly, the embodiments disclosed above are mere exemplification in all the aspects, but shall not be regarded as the basis of limitative interpretation. The scope of the present invention shall be defined based on Claims, not restricted by the main paragraph of Description. Furthermore, all the modifications and changes, which are included within the scope of the equivalents to Claims, are included in the scope of the present invention.

The invention claimed is:

1. An engine driven heat pump, comprising:
    an engine;
    a control unit;
    a plurality of compressors configured to be driven by the engine;
    a refrigerant circuit configured to flow a refrigerant sucked and discharged by the compressors;
    a generator configured to be driven by the engine;
    a plurality of compressor clutches respectively provided in the compressors and configured to switch between an ON state where drive from the engine is transmitted to the respective compressors and an OFF state where transmission of the drive from the engine to the respective compressors is cut off;
    an engine actuation battery configured to actuate the engine;
    a battery charging circuit configured to charge the engine actuation battery; and
    an inverter configured to convert output power from the generator into a predetermined voltage and a predetermined frequency;
    wherein the control unit is configured to place the compressor clutches into the ON state or the OFF state, and set engine RPM to a reference RPM required for the generator to supply predetermined power during a self-sustaining operation;
    wherein the control unit is configured to increase or decrease the number of the compressor clutches connected to the engine, and set the engine RPM to the reference RPM during the self-sustaining operation;
    wherein the control unit is configured to set the engine RPM to the reference RPM and maintain the engine in the reference RPM for a predetermined first duration time subsequent to the control unit switching the compressor clutches when a load of the engine driven heat pump increases with a lapse of time, and after that, the control unit is configured to control the engine in accordance with the load of the engine driven heat pump; and
    wherein the control unit is configured to set the engine RPM to the reference RPM and maintain the engine in the reference RPM for a predetermined second duration time shorter than the first duration time subsequent to the control unit switching the compressor clutches when a load of the engine driven heat pump decreases with a lapse of time, and after that, the control unit is configured to control the engine in accordance with the load of the engine driven heat pump.

* * * * *